(12) United States Patent
Zhang et al.

(10) Patent No.: US 9,936,394 B2
(45) Date of Patent: Apr. 3, 2018

(54) METHOD FOR PROCESSING DATA AFTER UNLICENSED SPECTRUM IS RELEASED, AND USER EQUIPMENT

(71) Applicant: Huawei Technologies Co., Ltd., Shenzhen, Guangdong (CN)

(72) Inventors: Jian Zhang, Shanghai (CN); Mingzeng Dai, Shanghai (CN); Qufang Huang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 15/240,873

(22) Filed: Aug. 18, 2016

(65) Prior Publication Data

US 2016/0360422 A1     Dec. 8, 2016

Related U.S. Application Data

(63) Continuation of application No. PCT/CN2014/072236, filed on Feb. 19, 2014.

(51) Int. Cl.
*H04W 4/00* (2009.01)
*H04W 16/14* (2009.01)
(Continued)

(52) U.S. Cl.
CPC .......... *H04W 16/14* (2013.01); *H04B 7/0413* (2013.01); *H04L 1/1822* (2013.01);
(Continued)

(58) Field of Classification Search
USPC ........................ 370/329, 280, 330
See application file for complete search history.

(56) References Cited

U.S. PATENT DOCUMENTS

2006/0009202 A1   1/2006  Gallagher et al.
2007/0099653 A1   5/2007  Parron et al.
(Continued)

FOREIGN PATENT DOCUMENTS

CN    101998587 A    3/2011
CN    103220716 A    7/2013
(Continued)

*Primary Examiner* — Phuongchau Ba Nguyen

(57) ABSTRACT

A method for processing data after an unlicensed spectrum is released, and user equipment are disclosed. The method includes: when user equipment determines that a base station has released an unlicensed spectrum, monitoring, by the user equipment, release time for which the unlicensed spectrum is released a release time for which the unlicensed spectrum is released; when the release time does not exceed a time threshold, pausing, by the user equipment, a data processing process attached to the unlicensed spectrum, and resuming the data processing process after the base station re-acquires the unlicensed spectrum; and when the release time exceeds the time threshold, terminating, by the user equipment, the data processing process attached to the unlicensed spectrum, and selecting a licensed spectrum to start a new data processing process, or after the base station re-acquires the unlicensed spectrum, starting a new data processing process.

10 Claims, 2 Drawing Sheets

(51) Int. Cl.
*H04B 7/0413* (2017.01)
*H04L 1/18* (2006.01)
*H04W 76/04* (2009.01)
*H04W 76/06* (2009.01)

(52) U.S. Cl.
CPC ......... *H04W 4/008* (2013.01); *H04W 76/048* (2013.01); *H04W 76/064* (2013.01)

(56) References Cited

U.S. PATENT DOCUMENTS

| | | | |
|---|---|---|---|
| 2013/0003533 A1 | 1/2013 | Barbieri et al. | |
| 2015/0023315 A1* | 1/2015 | Yerramalli | H04W 74/002 370/330 |
| 2016/0338096 A1* | 11/2016 | Vajapeyam | H04L 1/1861 |
| 2017/0279565 A1* | 9/2017 | Han | H04L 1/1887 |
| 2017/0311337 A1* | 10/2017 | Mo | H04W 72/12 |

FOREIGN PATENT DOCUMENTS

| | | | |
|---|---|---|---|
| CN | 103220718 A | 7/2013 | |
| JP | 2006503500 A | 1/2006 | |
| WO | 2013097144 A1 | 7/2013 | |
| WO | 2013120253 A1 | 8/2013 | |

\* cited by examiner

METHOD FOR PROCESSING DATA AFTER UNLICENSED SPECTRUM IS RELEASED, AND USER EQUIPMENT

CROSS-REFERENCE TO RELATED APPLICATIONS

This application is a continuation of International Application No. PCT/CN2014/072236, filed on Feb. 19, 2014, which is hereby incorporated by reference in its entirety.

TECHNICAL FIELD

The present invention relates to the field of electronic technologies, and in particular, to a method for processing data after an unlicensed spectrum is released, and user equipment.

BACKGROUND

According to the latest released Federal Communications Commission (Federal Communications Commission, FCC) white paper on International spectrum, an unlicensed spectrum or a permit-free spectrum (unlicensed spectrum) resource is greater than a licensed spectrum resource. The unlicensed spectrum includes a frequency band used for an industrial, scientific and medical (ISM, Industrial, scientific and medical) device or the like. For example, there are three frequency bands 902-928 MHz, 2400-2484.5 MHz, and 5725-5850 MHz in the United States of America, and 2.4 GHz is an ISM frequency band shared by countries. Main technologies used in the 2.4 GHz ISM frequency band are: wireless fidelity (WiFi, Wireless Fidelity) or wireless local area network (WLAN, wireless local network), Bluetooth, Zigbee (Zigbee), and the like. WiFi is based on the Institute of Electrical and Electronics Engineers (IEEE, Institute of Electrical and Electronics Engineers) 802.11 standards, for example, 802.11 a, 802.11b, 802.11g, 802.11n, and 802.11ac. WiFi generally uses the 2.4 GHz ISM frequency band and the 5 GHz frequency band. For example, the 802.11ac may use a 5 GHz unlicensed spectrum. In Europe and Japan, ranges of frequencies that can be used by the 802.11 ac include 5170 MHz-5330 MHz and 5490-5710 MHz. In addition to the foregoing frequency ranges, a frequency range of 5710-5730 MHz is also supported in the United States of America. 802.11ac channelization (channelization) may support bandwidths of 20 MHz, 40 MHz, 80 MHz, and 160 MHz.

The unlicensed spectrum is shared by many users, and the users may use different radio access technologies (RAT, radio access technology), for example, LTE, WiFi, and Bluetooth (Bluetooth). Before transmission, LTE, WiFi, and Bluetooth devices using the unlicensed spectrum need to first listen to whether the spectrum is idle, that is, "listen before talk (LBT, Listen before Talk)", to avoid interference to another user who is using the unlicensed spectrum. There also is a corresponding specification for a maximum occupation time after a user acquires the unlicensed spectrum. The user needs to release the unlicensed spectrum after using the spectrum for a particular time, and start to contend for the unlicensed spectrum after the user is idle for a particular time, so as to provide a fair competition opportunity for all users to use the unlicensed spectrum.

However, currently in the prior art, there is a lack of a corresponding processing mechanism after an unlicensed spectrum resource is released.

SUMMARY

Embodiments of the present invention provide a method for processing data after an unlicensed spectrum is released, and user equipment, to ensure that after an unlicensed spectrum is re-acquired, communication is smooth, which saves radio resources.

A first aspect of the embodiments of the present invention provides a method for processing data after an unlicensed spectrum is released, including:

when user equipment determines that a base station has released an unlicensed spectrum, monitoring, by the user equipment, a release time for which the unlicensed spectrum is released, where the release time indicates a time interval from when the base station releases the unlicensed spectrum to when the base station re-acquires the unlicensed spectrum;

when the release time does not exceed a time threshold, pausing, by the user equipment, a data processing process attached to the unlicensed spectrum, and resuming the data processing process after the base station re-acquires the unlicensed spectrum; and when the release time exceeds the time threshold, terminating, by the user equipment, the data processing process attached to the unlicensed spectrum, and selecting a licensed spectrum to start a new data processing process, or after the base station re-acquires the unlicensed spectrum, starting a new data processing process.

With reference to the first aspect, in a first feasible implementation manner, that user equipment determines that a base station has released an unlicensed spectrum includes:

when the user equipment receives indication information that is sent by the base station and that indicates that the unlicensed spectrum has been released, the user equipment determines that the base station has released the unlicensed spectrum;

or the user equipment detects, according to a parameter of the base station, that the base station has released the unlicensed spectrum.

With reference to the first aspect or the first feasible implementation manner of the first aspect, in a second feasible implementation manner, the monitoring, by the user equipment, a release time for which the unlicensed spectrum is released includes:

starting, by the user equipment, a wait timer to record the release time for which the unlicensed spectrum is released, and when the wait timer does not time out, determining that the release time does not exceed the time threshold, or after the wait timer times out, determining that the release time exceeds the time threshold; or receiving, by the user equipment, a specific release time, sent by the base station, of the unlicensed spectrum, and comparing the received release time with a preset time threshold to determine whether the received release time exceeds the preset time threshold; or receiving, by the user equipment, an indication that is sent by the base station and that indicates that the unlicensed spectrum has been released, calculating a release time of the base station for the unlicensed spectrum according to the release indication and a preset rule, and comparing the release time obtained through calculation with a preset time threshold to determine whether the received release time exceeds the preset time threshold.

With reference to the second feasible implementation manner of the first aspect, in a third feasible implementation manner, the wait timer includes a deactivation timer; and the specific release time of the unlicensed spectrum includes at least one of the following time: a time for which another device occupies the unlicensed spectrum, an interval period from when the unlicensed spectrum is released to when the unlicensed spectrum is acquired, a time reserved for another device to use the unlicensed spectrum, or a silent time of a system, in which the base station is located, in the unlicensed spectrum.

With reference to any one of the first aspect to the third feasible implementation manner of the first aspect, in a fourth feasible implementation manner, the data processing process includes a hybrid automatic repeat request HARQ process;

the pausing, by the user equipment, a data processing process attached to the unlicensed spectrum includes:

executing, by the user equipment, at least one of the following operations attached to the unlicensed spectrum: pausing listening on a physical downlink control channel, pausing downlink receiving, pausing uplink sending, reserving an HARQ buffer, pausing receiving downlink HARQ retransmission, pausing receiving downlink HARQ feedback information, pausing sending uplink HARQ retransmission, or pausing sending uplink HARQ feedback information; and the resuming, by the user equipment, the data processing process after the base station re-acquires the unlicensed spectrum includes:

after the base station re-acquires the unlicensed spectrum, executing, by the user equipment, at least one of the following operations attached to the unlicensed spectrum: resuming listening on the physical downlink control channel, resuming downlink receiving, resuming uplink sending, resuming receiving downlink HARQ retransmission, resuming receiving downlink HARQ feedback information, resuming sending uplink HARQ retransmission, or resuming sending uplink HARQ feedback information.

With reference to any one of the first aspect to the fourth feasible implementation manner of the first aspect, in a fifth feasible implementation manner, the data processing process includes a hybrid automatic repeat request HARQ process;

the terminating, by the user equipment, the data processing process attached to the unlicensed spectrum includes:

executing, by the user equipment, an HARQ entity reset operation, or executing a deactivation operation for a cell using the unlicensed spectrum; and the selecting a licensed spectrum to start a new data processing process, or after the base station re-acquires the unlicensed spectrum, starting a new data processing process includes:

selecting, by the user equipment, a licensed spectrum to start a new HARQ processing process, or after the base station re-acquires the unlicensed spectrum, starting a new HARQ processing process.

With reference to any one of the first aspect to the third feasible implementation manner of the first aspect, in a sixth feasible implementation manner, the data processing process includes a discontinuous reception DRX process;

the pausing, by the user equipment, a data processing process attached to the unlicensed spectrum includes:

executing, by the user equipment, at least one of the following operations attached to the unlicensed spectrum: maintaining normal running of each DRX timer, pausing listening on a physical downlink control channel, pausing downlink receiving, or pausing uplink sending; and the resuming, by the user equipment, the data processing process after the base station re-acquires the unlicensed spectrum includes:

executing, by the user equipment, at least one of the following operations attached to the unlicensed spectrum: after the base station re-acquires the unlicensed spectrum, resuming listening on the physical downlink control channel, resuming downlink receiving, or resuming uplink sending.

With reference to any one of the first aspect to the third feasible implementation manner of the first aspect and the sixth feasible implementation manner of the first aspect, in a seventh feasible implementation manner, the data processing process includes a discontinuous reception DRX process;

the terminating, by the user equipment, the data processing process attached to the unlicensed spectrum includes:

executing, by the user equipment, at least one of the following operations attached to the unlicensed spectrum: executing an HARQ entity reset operation, executing a deactivation operation for a cell using the unlicensed spectrum, or stopping each DRX timer; and the selecting a licensed spectrum to start a new data processing process, or after the base station re-acquires the unlicensed spectrum, starting a new data processing process includes:

selecting, by the user equipment, a licensed spectrum to start a new DRX processing process, or maintaining a DRX processing process running in a licensed spectrum, or after the base station re-acquires the unlicensed spectrum, starting a new DRX processing process.

With reference to the seventh feasible implementation manner of the first aspect, in an eighth feasible implementation manner, when a cell in the unlicensed spectrum and a cell in the licensed spectrum use a same DRX parameter configuration and DRX operation, when terminating the data processing process attached to the unlicensed spectrum, the user equipment does not stop each DRX timer; or when a cell in the unlicensed spectrum and a cell in the licensed spectrum execute different DRX parameter configurations, when terminating the data processing process attached to the unlicensed spectrum, the user equipment stops each DRX timer.

With reference to any one of the first aspect to the third feasible implementation manner of the first aspect, in a ninth feasible implementation manner, the data processing process includes an automatic repeat request ARQ process;

the pausing, by the user equipment, a data processing process attached to the unlicensed spectrum includes:

executing, by the user equipment, at least one of the following operations attached to the unlicensed spectrum: suspending a reordering timer of a radio link control layer RLC or suspending a poll retransmit timer; and the resuming, by the user equipment, the data processing process after the base station re-acquires the unlicensed spectrum includes:

after the base station re-acquires the unlicensed spectrum, executing, by the user equipment, at least one of the following operations attached to the unlicensed spectrum: resuming the reordering timer of the radio link control layer and triggering an RLC status report after the reordering timer times out; or resuming the poll retransmit timer, and after the poll retransmit timer times out, triggering retransmitting an RLC data unit provided with a poll bit or sending a new RLC data unit.

With reference to any one of the first aspect to the third feasible implementation manner of the first aspect and the ninth feasible implementation manner, in a tenth feasible implementation manner, the data processing process includes an automatic repeat request ARQ process;

the terminating, by the user equipment, the data processing process attached to the unlicensed spectrum includes:

executing, by the user equipment, at least one of the following operations attached to the unlicensed spectrum: stopping a reordering timer or stopping a poll retransmit timer; and the selecting a licensed spectrum to start a new data processing process, or after the base station re-acquires the unlicensed spectrum, starting a new data processing process includes:

selecting, by the user equipment, a licensed spectrum to start a new ARQ processing process, or after the base station re-acquires the unlicensed spectrum, starting a new ARQ processing process.

With reference to any one of the first aspect to the third feasible implementation manner of the first aspect, in an eleventh feasible implementation manner, the data processing process includes a random access procedure;

the pausing, by the user equipment, a data processing process attached to the unlicensed spectrum includes:

executing, by the user equipment, at least one of the following operations attached to the unlicensed spectrum: suspending a random access response window or suspending a contention resolution timer; and the resuming, by the user equipment, the data processing process after the base station re-acquires the unlicensed spectrum includes:

after the base station re-acquires the unlicensed spectrum, executing, by the user equipment, at least one of the following operations attached to the unlicensed spectrum: resuming the random access response window or resuming running of the contention resolution timer.

With reference to any one of the first aspect to the third feasible implementation manner of the first aspect and the eleventh feasible implementation manner of the first aspect, in a twelfth feasible implementation manner, the data processing process includes a random access procedure;

the terminating, by the user equipment, the data processing process attached to the unlicensed spectrum includes:

executing, by the user equipment, at least one of the following operations attached to the unlicensed spectrum: stopping a random access response window and stopping waiting for a random access response message, or stopping a contention resolution timer and stopping waiting for a contention resolution message; and the selecting, by the user equipment, a licensed spectrum to start a new data processing process, or after the base station re-acquires the unlicensed spectrum, starting a new data processing process includes:

selecting, by the user equipment, a licensed spectrum to start a new random access procedure, or after the base station re-acquires the unlicensed spectrum, starting a new random access procedure.

With reference to any one of the first aspect to the third feasible implementation manner of the first aspect, in a thirteenth feasible implementation manner, the data processing process includes a radio resource management RRM measurement process;

the pausing, by the user equipment, a data processing process attached to the unlicensed spectrum includes:

pausing, by the user equipment, the RRM measurement process; and the resuming, by the user equipment, the data processing process after the base station re-acquires the unlicensed spectrum includes:

resuming, by the user equipment, the RRM measurement process.

With reference to any one of the first aspect to the third feasible implementation manner of the first aspect and the thirteenth feasible implementation manner of the first aspect, in a fourteenth feasible implementation manner, the data processing process includes a radio resource management RRM measurement process;

the terminating, by the user equipment, the data processing process attached to the unlicensed spectrum includes:

releasing, by the user equipment, an RRM measurement parameter; and the selecting, by the user equipment, a licensed spectrum to start a new data processing process, or after the base station re-acquires the unlicensed spectrum, starting a new data processing process includes:

selecting, by the user equipment, a licensed spectrum to start a new RRM measurement process, or after the base station re-acquires the unlicensed spectrum, starting a new RRM process.

With reference to any one of the first aspect to the third feasible implementation manner of the first aspect, in a fifteenth feasible implementation manner, the data processing process includes a channel state information CSI measurement process;

the pausing, by the user equipment, a data processing process attached to the unlicensed spectrum includes:

pausing, by the user equipment, the CSI measurement process; and the resuming, by the user equipment, the data processing process after the base station re-acquires the unlicensed spectrum includes:

resuming, by the user equipment, the CSI measurement process.

With reference to any one of the first aspect to the third feasible implementation manner of the first aspect and the fifteenth feasible implementation manner of the first aspect, in a sixteenth feasible implementation manner, the data processing process includes a channel state information CSI measurement process;

the terminating, by the user equipment, the data processing process attached to the unlicensed spectrum includes:

releasing, by the user equipment, a CSI measurement parameter; and the selecting, by the user equipment, a licensed spectrum to start a new data processing process, or after the base station re-acquires the unlicensed spectrum, starting a new data processing process includes:

selecting, by the user equipment, a licensed spectrum to start a new CSI measurement process, or after the base station re-acquires the unlicensed spectrum, starting a new CSI process.

A second aspect of the embodiments of the present invention provides user equipment, including:

a monitoring module, configured to: when the user equipment determines that a base station has released an unlicensed spectrum, monitor release time for which the unlicensed spectrum is released, where the release time indicates a time interval from when the base station releases the unlicensed spectrum to when the base station re-acquires the unlicensed spectrum;

a first processing module, configured to: when the release time monitored by the monitoring module does not exceed a time threshold, pause a data processing process attached to the unlicensed spectrum, and resume the data processing process after the base station re-acquires the unlicensed spectrum; and a second processing module, configured to: when the release time monitored by the monitoring module exceeds the time threshold, terminate the data processing process attached to the unlicensed spectrum, and select a licensed spectrum to start a new data processing process, or after the base station re-acquires the unlicensed spectrum, start a new data processing process.

With reference to the second aspect, in a first possible implementation manner, the user equipment further includes:

a release determining module, configured to: when indication information that is sent by the base station and that indicates that the unlicensed spectrum has been released is received, determine that the base station has released the unlicensed spectrum; or detect, according to a parameter of the base station, that the base station has released the unlicensed spectrum.

With reference to second aspect or the first feasible implementation manner of the second aspect, in a second feasible implementation manner, the monitoring module includes:

a first monitoring module, configured to start a wait timer to record the release time for which the unlicensed spectrum is released, and when the wait timer does not time out, determine that the release time does not exceed the time threshold, or after the wait timer times out, determine that the release time exceeds the time threshold;

or a second monitoring module, configured to receive a specific release time, sent by the base station, of the unlicensed spectrum, and compare the received release time with a preset time threshold to determine whether the received release time exceeds the preset time threshold;

or a third monitoring module, configured to receive an indication that is sent by the base station and that indicates that the unlicensed spectrum has been released, calculate a release time of the base station for the unlicensed spectrum according to the release indication and a preset rule, and compare the release time obtained through calculation with a preset time threshold to determine whether the received release time exceeds the preset time threshold.

With reference to the second feasible implementation manner of the second aspect, in a third feasible implementation manner, the wait timer includes a deactivation timer; and the specific release time of the unlicensed spectrum includes at least one of the following time: a time for which another device occupies the unlicensed spectrum, a time reserved for another device to use the unlicensed spectrum, or a silent time of a system, in which the base station is located, in the unlicensed spectrum.

With reference to any one of the second aspect to the third feasible implementation manner of the second aspect, in a fourth feasible implementation manner, the data processing process includes a hybrid automatic repeat request HARQ process; and the first processing module is specifically configured to: when the release time monitored by the monitoring module does not exceed the time threshold, execute at least one of the following operations attached to the unlicensed spectrum: pausing listening on a physical downlink control channel, pausing downlink receiving, pausing uplink sending, reserving an HARQ buffer, pausing receiving downlink HARQ retransmission, pausing receiving downlink HARQ feedback information, pausing sending uplink HARQ retransmission, or pausing sending uplink HARQ feedback information; and after the base station re-acquires the unlicensed spectrum, execute at least one of the following operations attached to the unlicensed spectrum: resuming listening on the physical downlink control channel, resuming downlink receiving, resuming uplink sending, resuming receiving downlink HARQ retransmission, resuming receiving downlink HARQ feedback information, resuming sending uplink HARQ retransmission, or resuming sending uplink HARQ feedback information.

With reference to any one of the second aspect to the fourth feasible implementation manner of the second aspect, in a fifth feasible implementation manner, the data processing process includes a hybrid automatic repeat request HARQ process; and the second processing module is specifically configured to: when the release time monitored by the monitoring module exceeds the time threshold, execute an HARQ entity reset operation, or execute a deactivation operation for a cell using the unlicensed spectrum; and select a licensed spectrum to start a new HARQ processing process, or after the base station re-acquires the unlicensed spectrum, start a new HARQ processing process With reference to any one of the second aspect to the third feasible implementation manner of the second aspect, in a sixth feasible implementation manner, the data processing process includes a discontinuous reception DRX process; and the first processing module is specifically configured to: when the release time monitored by the monitoring module does not exceed the time threshold, execute at least one of the following operations attached to the unlicensed spectrum: maintaining normal running of each DRX timer, pausing listening on a physical downlink control channel, pausing downlink receiving, or pausing uplink sending; and after the base station re-acquires the unlicensed spectrum, execute at least one of the following operations attached to the unlicensed spectrum: after the base station re-acquires the unlicensed spectrum, resuming listening on the physical downlink control channel, resuming downlink receiving, or resuming uplink sending.

With reference to any one of the second aspect to the third feasible implementation manner of the second aspect and the sixth feasible implementation manner of the second aspect, in a seventh feasible implementation manner, the data processing process includes a discontinuous reception DRX process; and the second processing module is specifically configured to: when the release time monitored by the monitoring module exceeds the time threshold, execute at least one of the following operations attached to the unlicensed spectrum: executing an HARQ entity reset operation, executing a deactivation operation for a cell using the unlicensed spectrum, or stopping each DRX timer; and select a licensed spectrum to start a new DRX processing process, or maintain a DRX processing process running in a licensed spectrum, or after the base station re-acquires the unlicensed spectrum, start a new DRX processing process.

With reference to the seventh feasible implementation manner of the second aspect, in an eighth feasible implementation manner, when a cell in the unlicensed spectrum and a cell in the licensed spectrum use a same DRX parameter configuration and DRX operation, the second processing module does not stop each DRX timer; or when a cell in the unlicensed spectrum and a cell in the licensed spectrum execute different DRX parameters, the second processing module stops each DRX timer.

With reference to any one of the second aspect to the third feasible implementation manner of the second aspect, in a ninth feasible implementation manner, the data processing process includes an automatic repeat request ARQ process; and the first processing module is specifically configured to: when the release time monitored by the monitoring module does not exceed the time threshold, execute at least one of the following operations attached to the unlicensed spectrum: suspending a reordering timer of a radio link control layer RLC or suspending a poll retransmit timer; and after the base station re-acquires the unlicensed spectrum, execute at least one of the following operations attached to the unlicensed spectrum: resuming the reordering timer of the radio link control layer and triggering an RLC status report after the reordering timer times out; or resuming the poll retransmit timer, and after the poll retransmit timer times out, triggering retransmitting an RLC data unit provided with a poll bit or sending a new RLC data unit.

With reference to any one of the second aspect to the third feasible implementation manner of the second aspect and the ninth feasible implementation manner, in a tenth feasible implementation manner, the data processing process includes an automatic repeat request ARQ process; and the second processing module is specifically configured to: when the release time monitored by the monitoring module exceeds the time threshold, execute at least one of the following operations attached to the unlicensed spectrum: stopping a reordering timer or stopping a poll retransmit timer; and select a licensed spectrum to start a new ARQ processing process, or after the base station re-acquires the unlicensed spectrum, start a new ARQ processing process.

With reference to any one of the second aspect to the third feasible implementation manner of the second aspect, in an eleventh feasible implementation manner, the data processing process includes a random access procedure; and the first processing module is specifically configured to: when the release time monitored by the monitoring module does not exceed the time threshold, execute at least one of the following operations attached to the unlicensed spectrum: suspending a random access response window or suspending a contention resolution timer; and after the base station re-acquires the unlicensed spectrum, execute at least one of the following operations attached to the unlicensed spectrum: resuming the random access response window or resuming running of the contention resolution timer.

With reference to any one of the second aspect to the third feasible implementation manner of the second aspect and the eleventh feasible implementation manner of the second aspect, in a twelfth feasible implementation manner, the data processing process includes a random access procedure; and the second processing module is specifically configured to: when the release time monitored by the monitoring module exceeds the time threshold, execute at least one of the following operations attached to the unlicensed spectrum: stopping a random access response window and stopping waiting for a random access response message, or stopping a contention resolution timer and stopping waiting for a contention resolution message; and select a licensed spectrum to start a new random access procedure, or after the base station re-acquires the unlicensed spectrum, start a new random access procedure.

With reference to any one of the second aspect to the third feasible implementation manner of the second aspect, in a thirteenth feasible implementation manner, the data processing process includes a radio resource management RRM measurement process; and the first processing module is specifically configured to: when the release time monitored by the monitoring module does not exceed the time threshold, pause the RRM measurement process; and after the base station re-acquires the unlicensed spectrum, resume the RRM measurement process.

With reference to any one of the second aspect to the third feasible implementation manner of the second aspect and the thirteenth feasible implementation manner of the second aspect, in a fourteenth feasible implementation manner, the data processing process includes a radio resource management RRM measurement process; and the second processing module is specifically configured to: when the release time monitored by the monitoring module exceeds the time threshold, release an RRM measurement parameter; and select a licensed spectrum to start a new RRM measurement process, or after the base station re-acquires the unlicensed spectrum, start a new RRM process.

With reference to any one of the second aspect to the third feasible implementation manner of the second aspect, in a fifteenth feasible implementation manner, the data processing process includes a channel state information CSI measurement process; and the first processing module is specifically configured to: when the release time monitored by the monitoring module does not exceed the time threshold, pause the CSI measurement process; and after the base station re-acquires the unlicensed spectrum, resume the CSI measurement process.

With reference to any one of the second aspect to the third feasible implementation manner of the second aspect and the fifteenth feasible implementation manner of the second aspect, in a sixteenth feasible implementation manner, the data processing process includes a channel state information CSI measurement process; and the second processing module is specifically configured to: when the release time monitored by the monitoring module exceeds the time threshold, release a CSI measurement parameter; and select a licensed spectrum to start a new CSI measurement process, or after the base station re-acquires the unlicensed spectrum, start a new CSI process.

A third aspect of the embodiments of the present invention provides user equipment, including: a memory and a processor, where the processor invokes a program stored in the memory, and performs the following process:

when determining that a base station has released an unlicensed spectrum, monitoring release time for which the unlicensed spectrum is released, where the release time indicates a time interval from when the base station releases the unlicensed spectrum to when the base station re-acquires the unlicensed spectrum;

when the release time does not exceed a time threshold, pausing a data processing process attached to the unlicensed spectrum, and resuming the data processing process after the base station re-acquires the unlicensed spectrum; and when the release time exceeds the time threshold, terminating the data processing process attached to the unlicensed spectrum, and selecting a licensed spectrum to start a new data processing process, or after the base station re-acquires the unlicensed spectrum, starting a new data processing process.

With reference to the third aspect, in a first feasible implementation manner, that the processor determines that a base station has released an unlicensed spectrum includes:

when the user equipment receives indication information that is sent by the base station and that indicates that the unlicensed spectrum has been released, the processor determines that the base station has released the unlicensed spectrum;

or the processor detects, according to a parameter of the base station, that the base station has released the unlicensed spectrum.

With reference to the third aspect or the first feasible implementation manner of the third aspect, in a second feasible implementation manner, the monitoring, by the processor, release time for which the unlicensed spectrum is released includes:

starting, by the processor, a wait timer to record the release time for which the unlicensed spectrum is released, and when the wait timer does not time out, determining that the release time does not exceed the time threshold, or after the wait timer times out, deteii lining that the release time exceeds the time threshold; or receiving, by the processor, a specific release time, sent by the base station, of the unlicensed spectrum, and comparing the received release time with a preset time threshold to determine whether the received release time exceeds the preset time threshold; or receiving, by the processor, an indication that is sent by the base station and that indicates that the unlicensed spectrum has been released, calculating a release time of the base station for the unlicensed spectrum according to the release indication and a preset rule, and comparing the release time obtained through calculation with a preset time threshold to determine whether the received release time exceeds the preset time threshold.

With reference to the second feasible implementation manner of the third aspect, in a third feasible implementation manner, the wait timer includes a deactivation timer; and the specific release time of the unlicensed spectrum includes at least one of the following time: a time for which another device occupies the unlicensed spectrum, a time reserved for another device to use the unlicensed spectrum, or a silent time of a system, in which the base station is located, in the unlicensed spectrum.

With reference to any one of the third aspect to the third feasible implementation manner of the third aspect, in a fourth feasible implementation manner, the data processing process includes a hybrid automatic repeat request HARQ process;

the pausing, by the processor, a data processing process attached to the unlicensed spectrum includes:

executing, by the processor, at least one of the following operations attached to the unlicensed spectrum: pausing listening on a physical downlink control channel, pausing downlink receiving, pausing uplink sending, reserving an HARQ buffer, pausing receiving downlink HARQ retransmission, pausing receiving downlink HARQ feedback information, pausing sending uplink HARQ retransmission, or pausing sending uplink HARQ feedback information; and the resuming, by the processor, the data processing process after the base station re-acquires the unlicensed spectrum includes:

after the base station re-acquires the unlicensed spectrum, executing, by the processor, at least one of the following operations attached to the unlicensed spectrum: resuming listening on the physical downlink control channel, resuming downlink receiving, resuming uplink sending, resuming receiving downlink HARQ retransmission, resuming receiving downlink HARQ feedback information, resuming sending uplink HARQ retransmission, or resuming sending uplink HARQ feedback information.

With reference to any one of the third aspect to the fourth feasible implementation manner of the third aspect, in a fifth feasible implementation manner, the data processing process includes a hybrid automatic repeat request HARQ process;

the terminating, by the processor, the data processing process attached to the unlicensed spectrum includes:

executing, by the processor, an HARQ entity reset operation, or executing a deactivation operation for a cell using the unlicensed spectrum; and the selecting a licensed spectrum to start a new data processing process, or after the base station re-acquires the unlicensed spectrum, starting a new data processing process includes:

selecting, by the processor, a licensed spectrum to start a new HARQ processing process, or after the base station re-acquires the unlicensed spectrum, starting a new HARQ processing process.

With reference to any one of the third aspect to the third feasible implementation manner of the third aspect, in a sixth feasible implementation manner, the data processing process includes a discontinuous reception DRX process;

the pausing, by the processor, a data processing process attached to the unlicensed spectrum includes:

executing, by the processor, at least one of the following operations attached to the unlicensed spectrum: maintaining normal running of each DRX timer, pausing listening on a physical downlink control channel, pausing downlink receiving, or pausing uplink sending; and the resuming, by the processor, the data processing process after the base station re-acquires the unlicensed spectrum includes:

executing, by the processor, at least one of the following operations attached to the unlicensed spectrum: after the base station re-acquires the unlicensed spectrum, resuming listening on the physical downlink control channel, resuming downlink receiving, or resuming uplink sending.

With reference to any one of the third aspect to the third feasible implementation manner of the third aspect and the sixth feasible implementation manner of the third aspect, in a seventh feasible implementation manner, the data processing process includes a discontinuous reception DRX process;

the terminating, by the processor, the data processing process attached to the unlicensed spectrum includes:

executing, by the processor, at least one of the following operations attached to the unlicensed spectrum: executing an HARQ entity reset operation, executing a deactivation operation for a cell using the unlicensed spectrum, or stopping each DRX timer; and the selecting a licensed spectrum to start a new data processing process, or after the base station re-acquires the unlicensed spectrum, starting a new data processing process includes:

selecting, by the processor, a licensed spectrum to start a new DRX processing process, or maintaining a DRX processing process running in a licensed spectrum, or after the base station re-acquires the unlicensed spectrum, starting a new DRX processing process.

With reference to the seventh feasible implementation manner of the third aspect, in an eighth feasible implementation manner, when a cell in the unlicensed spectrum and a cell in the licensed spectrum use a same DRX parameter configuration and DRX operation, when terminating the data processing process attached to the unlicensed spectrum, the processor does not stop each DRX timer; or when a cell in the unlicensed spectrum and a cell in the licensed spectrum execute different DRX parameter configurations, when terminating the data processing process attached to the unlicensed spectrum, the processor stops each DRX timer.

With reference to any one of the third aspect to the third feasible implementation manner of the third aspect, in a ninth feasible implementation manner, the data processing process includes an automatic repeat request ARQ process;

the pausing, by the processor, a data processing process attached to the unlicensed spectrum includes:

executing, by the processor, at least one of the following operations attached to the unlicensed spectrum: suspending a reordering timer of a radio link control layer RLC or suspending a poll retransmit timer; and the resuming, by the processor, the data processing process after the base station re-acquires the unlicensed spectrum includes:

after the base station re-acquires the unlicensed spectrum, executing, by the processor, at least one of the following operations attached to the unlicensed spectrum: resuming the reordering timer of the radio link control layer and triggering an RLC status report after the reordering timer times out; or resuming the poll retransmit timer, and after the poll retransmit timer times out, triggering retransmitting an RLC data unit provided with a poll bit or sending a new RLC data unit.

With reference to any one of the third aspect to the third feasible implementation manner of the third aspect and the ninth feasible implementation manner, in a tenth feasible implementation manner, the data processing process includes an automatic repeat request ARQ process;

the terminating, by the processor, the data processing process attached to the unlicensed spectrum includes:

executing, by the processor, at least one of the following operations attached to the unlicensed spectrum: stopping a reordering timer or stopping a poll retransmit timer; and the selecting a licensed spectrum to start a new data processing process, or after the base station re-acquires the unlicensed spectrum, starting a new data processing process includes:

selecting, by the processor, a licensed spectrum to start a new ARQ processing process, or after the base station re-acquires the unlicensed spectrum, starting a new ARQ processing process.

With reference to any one of the third aspect to the third feasible implementation manner of the third aspect, in an eleventh feasible implementation manner, the data processing process includes a random access procedure;

the pausing, by the processor, a data processing process attached to the unlicensed spectrum includes:

executing, by the processor, at least one of the following operations attached to the unlicensed spectrum: suspending a random access response window or suspending a contention resolution timer; and the resuming, by the processor, the data processing process after the base station re-acquires the unlicensed spectrum includes:

after the base station re-acquires the unlicensed spectrum, executing, by the processor, at least one of the following operations attached to the unlicensed spectrum: resuming the random access response window or resuming running of the contention resolution timer.

With reference to any one of the third aspect to the third feasible implementation manner of the third aspect and the eleventh feasible implementation manner of the third aspect, in a twelfth feasible implementation manner, the data processing process includes a random access procedure;

the terminating, by the processor, the data processing process attached to the unlicensed spectrum includes:

executing, by the processor, at least one of the following operations attached to the unlicensed spectrum: stopping a random access response window and stopping waiting for a random access response message, or stopping a contention resolution timer and stopping waiting for a contention resolution message; and the selecting, by the processor, a licensed spectrum to start a new data processing process, or after the base station re-acquires the unlicensed spectrum, starting a new data processing process includes:

selecting, by the processor, a licensed spectrum to start a new random access procedure, or after the base station re-acquires the unlicensed spectrum, starting a new random access procedure.

With reference to any one of the third aspect to the third feasible implementation manner of the third aspect, in a thirteenth feasible implementation manner, the data processing process includes a radio resource management RRM measurement process;

the pausing, by the processor, a data processing process attached to the unlicensed spectrum includes:

pausing, by the processor, the RRM measurement process; and the resuming, by the processor, the data processing process after the base station re-acquires the unlicensed spectrum includes:

resuming, by the processor, the RRM measurement process.

With reference to any one of the third aspect to the third feasible implementation manner of the third aspect and the thirteenth feasible implementation manner of the third aspect, in a fourteenth feasible implementation manner, the data processing process includes a radio resource management RRM measurement process;

the terminating, by the processor, the data processing process attached to the unlicensed spectrum includes:

releasing, by the processor, an RRM measurement parameter; and the selecting, by the processor, a licensed spectrum to start a new data processing process, or after the base station re-acquires the unlicensed spectrum, starting a new data processing process includes:

selecting, by the processor, a licensed spectrum to start a new RRM measurement process, or after the base station re-acquires the unlicensed spectrum, starting a new RRM process.

With reference to any one of the third aspect to the third feasible implementation manner of the third aspect, in a fifteenth feasible implementation manner, the data processing process includes a channel state information CSI measurement process;

the pausing, by the processor, a data processing process attached to the unlicensed spectrum includes:

pausing, by the processor, the CSI measurement process; and the resuming, by the processor, the data processing process after the base station re-acquires the unlicensed spectrum includes:

resuming, by the processor, the CSI measurement process.

With reference to any one of the third aspect to the third feasible implementation manner of the third aspect and the fifteenth feasible implementation manner of the third aspect, in a sixteenth feasible implementation manner, the data processing process includes a channel state information CSI measurement process;

the terminating, by the processor, the data processing process attached to the unlicensed spectrum includes:

releasing, by the processor, a CSI measurement parameter; and the selecting, by the processor, a licensed spectrum to start a new data processing process, or after the base station re-acquires the unlicensed spectrum, starting a new data processing process includes:

selecting, by the processor, a licensed spectrum to start a new CSI measurement process, or after the base station re-acquires the unlicensed spectrum, starting a new CSI process.

A fourth aspect of the present invention provides a computer storage medium, where the computer storage medium may store a program, and when the program is executed, some or all steps of the method described in the present invention may be executed.

As can be seen from the above, in some embodiments of the present invention, when user equipment determines that a base station has released an unlicensed spectrum, the user equipment monitors release time for which the unlicensed spectrum is released, where the release time indicates a time interval from when the base station releases the unlicensed spectrum to when the base station re-acquires the unlicensed spectrum; when the release time does not exceed a time threshold, the user equipment pauses a data processing process attached to the unlicensed spectrum, and resumes the data processing process after the base station re-acquires the unlicensed spectrum, thereby ensuring normal resumption of a communication process after the unlicensed spectrum is re-acquired; and when the release time exceeds the time threshold, the user equipment terminates the data processing process attached to the unlicensed spectrum, and selects a licensed spectrum to start a new data processing process, or after the base station re-acquires the unlicensed spectrum, starts a new data processing process, thereby avoiding wastes of radio resources caused by delayed redundant retransmission, and avoiding an impact on a throughput or a communication failure caused by transmission control protocol retransmission due to an excessively large data packet transmission delay.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
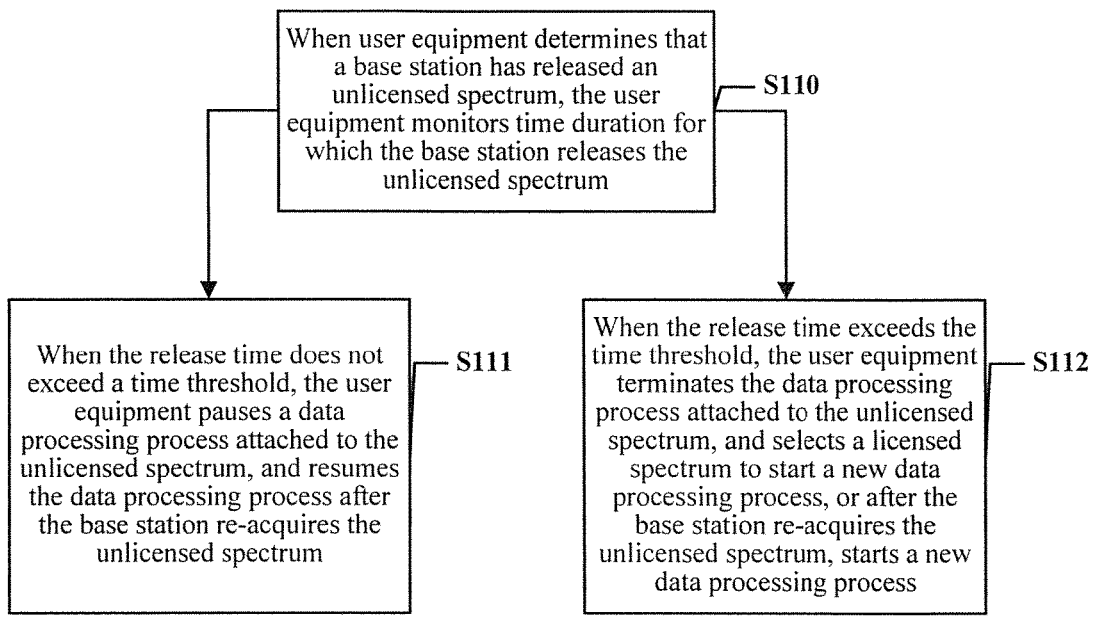
FIG. 1 is a schematic flowchart of an embodiment of a method for processing data after an unlicensed spectrum is released according to the embodiments of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In specific implementation, the unlicensed spectrum is shared by many users, and the users may use different radio access technologies (RAT, radio access technology), for example, LTE, WiFi, and Bluetooth (Bluetooth). Before transmission, LTE, WiFi, and Bluetooth devices using the unlicensed spectrum need to first listen to whether the spectrum is idle, that is, "listen before talk (LBT, Listen before Talk)", to avoid interference to another user who is using the unlicensed spectrum. There also is a corresponding specification for a maximum occupation time after a user acquires the unlicensed spectrum. The user needs to release the unlicensed spectrum after using the spectrum for a particular time, and start to contend for the unlicensed spectrum after the user is idle for a particular time, so as to provide a fair competition opportunity for all users to use the unlicensed spectrum. For example, description is made by using an example in which an LTE system and a WiFi system coexist in the unlicensed spectrum. The LTE system is representative of a cellular system, and the other cellular systems may include UMTS, GSM, CDMA2000, and the like. WiFi is representative of an inter-system. In specific implementation, LTE base stations generally may be classified into a pico base station (Pico eNB), a small cell (Micro or small eNB), or a macro base station (macro eNB) according to transmit power and downlink (downlink) coverage. The base station involved subsequently in the present invention may be any base station in the LTE system. In specific implementation, when an LTE system uses an unlicensed spectrum, in coverage of a base station, an inter-system such as a WiFi system may use an unlicensed spectrum in a same frequency band. In common coverage of the LTE system and the WiFi system, intra-frequency interference may exist. For example, when both coverage and frequencies of the LTE system and the WiFi system overlap, if the LTE system and the WiFi system perform communication in their respective systems in an overlapping frequency range, the intra-frequency interference may be caused. Therefore, the LTE system and the WiFi system need to coordinate with each other between the systems, or devices of the systems share an unlicensed spectrum by means of detection and backoff, so that the systems can normally perform communication. Therefore, there may be a case in which the LTE system or the WiFi system in the embodiments of the present invention needs to release the unlicensed spectrum, and contend for the unlicensed spectrum after being idle for a period of time, so as to maintain sharing of the unlicensed spectrum between the LTE system and the WiFi system. In some subsequent embodiments of the embodiments of the present invention, a processing process of each system after an unlicensed spectrum is released is described by using a data processing process in the LTE system after a base station releases an unlicensed spectrum as an example. Therefore, the subsequent method is also applicable to another system besides the LTE system.

Further, in the LTE system, in the 3GPP Long Term Evolution Advanced (LLTE-A, long term evolution advanced) carrier aggregation (CA, carrier aggregation), multiple consecutive or inconsecutive component carriers (CC, component carrier) are aggregated to improve the user peak data rate and the system throughput. The aggregated component carriers include one primary cell (PCell, Primary) and zero to five secondary cells (SCell, secondary cell), and supports a maximum of 100 MHz bandwidth. The PCell and the SCell may be co-site (collocate or co-site) or non co-site. For example, for the latter, a base station and a remote radio head (RRH, remote radio head) respectively provide the PCell and the SCell. The PCell is a cell (cell) when user equipment (UE, user equipment) executes a random access procedure (random access procedure) to initially access a system or a cell when user equipment executes a handover procedure (handover procedure) to access a target base station. The PCell further provides security (security) and non-access stratum (NAS, Non-Access Stratum) signaling transmission. The SCell mainly provides extra radio resources for data transmission. The LTE-A may use the unlicensed spectrum by means of the CA technology. Therefore, in some subsequent embodiments, description is made by using an example in which an SCell uses the unlicensed spectrum.

Specifically, FIG. 1 is a schematic flowchart of an embodiment of a method for processing data after an unlicensed spectrum is released according to an embodiment of the present invention. As shown in FIG. 1, the method may include:

Step 110: When user equipment determines that a base station has released an unlicensed spectrum, the user equipment monitors release time for which the unlicensed spectrum is released, where the release time indicates a time interval from when the base station releases the unlicensed spectrum to when the base station re-acquires the unlicensed spectrum.

Step S111: When the release time does not exceed a time threshold, the user equipment pauses a data processing process attached to the unlicensed spectrum, and resumes the data processing process after the base station re-acquires the unlicensed spectrum.

Step S112: When the release time exceeds the time threshold, the user equipment terminates the data processing process attached to the unlicensed spectrum, and selects a licensed spectrum to start a new data processing process, or after the base station re-acquires the unlicensed spectrum, starts a new data processing process.

In specific implementation, in step S110 or before step S110, the user equipment determines that the base station has released the unlicensed spectrum. The determining method includes, but not limited to, the following manner:

when the user equipment receives indication information that is sent by the base station and that indicates that the unlicensed spectrum has been released, the user equipment determines that the base station has released the unlicensed spectrum;

or the user equipment detects, according to a parameter of the base station, that the base station has released the unlicensed spectrum.

Using an LTE-A system as an example, after the base station acquires the unlicensed spectrum, the base station and the user equipment (UE) communicate with each other by using a radio resource of an SCell. After the base station and the user equipment communicate with each other for a period of time, the base station releases the unlicensed spectrum, and the base station sends the indication information indicating that the unlicensed spectrum has been released to the UE, where the indication information may be sent by using a physical downlink control channel (including a physical downlink control channel (Physical downlink control channel, PDCCH) or an enhanced physical downlink control channel (enhanced physical downlink control channel, EPDCCH)), or may be sent by using a Medium Access Control control element (Medium access control control element, MAC CE). When the UE receives the indication information that is sent by the base station by using the PDCCH or EPDCCH or MAC CE and that indicates that the unlicensed spectrum has been released, the UE can determine that the base station has released the unlicensed spectrum. Alternatively, the UE detects, by measuring an LTE reference signal, that the base station has released the unlicensed spectrum.

In specific implementation, in step S110, a manner in which the user equipment monitors the release time for which the unlicensed spectrum is released includes, but not limited to, the following manners:

Manner 1: The user equipment starts a wait timer to record the release time for which the unlicensed spectrum is released, and when the wait timer does not time out, determines that the release time does not exceed the time threshold, or after the wait timer times out, determines that the release time exceeds the time threshold.

Still using the LTE-A system as an example, after the UE determines that the base station has released the unlicensed spectrum, the UE starts a wait timer (which may be recorded as a wait-timer), to record the release time for which the unlicensed spectrum is released. Before the UE receives an indication that is sent by the base station and that indicates that the unlicensed spectrum has been re-acquired or if the UE does not detect that the base station has re-acquired the unlicensed spectrum, it indicates that the unlicensed spectrum is still in a release time period. Therefore, in this embodiment of the present invention, before the base station re-acquires the unlicensed spectrum and sends an indication to the UE, or before the UE detects that the base station has re-acquired the unlicensed spectrum (indicating that the release time of the unlicensed spectrum does not end), if the wait timer does not time out, the UE determines that the release time does not exceed the time threshold. Before the base station re-acquires the unlicensed spectrum and sends an indication to the UE or before the UE detects that the base station has re-acquired the unlicensed spectrum (indicating that the release time of the unlicensed spectrum does not end), if the wait timer times out, the UE determines that the release time exceeds the time threshold. In this manner, a time point when the wait timer times out is the time threshold. In specific implementation, the wait timer may be an independent timer, or re-use a deactivation timer (sCell-DeactivationTimer) in the prior art. After the UE receives an indication, of the base station, indicating that the unlicensed spectrum has been released or the UE itself detects that the unlicensed spectrum is released, the UE may start or restart the deactivation timer, or the UE continues to maintain the deactivation timer if the deactivation timer already runs. Before the deactivation timer times out, the UE determines that the release time does not exceed the time threshold. After the deactivation timer times out, the UE determines that the release time exceeds the time threshold.

Manner 2: The user equipment receives a specific release time, sent by the base station, of the unlicensed spectrum, and compares the received release time with a preset time threshold to determine whether the received release time exceeds the preset time threshold.

In specific implementation, the specific release time of the unlicensed spectrum includes at least one of the following time: a time for which another device occupies the unlicensed spectrum (for example, when detecting that a device having a high priority, such as a radar, occupies the unlicensed spectrum, the base station sends a time for which the radar occupies the unlicensed spectrum to the UE), an interval period from when the unlicensed spectrum is released to when the unlicensed spectrum is acquired (for example, period information may be periodical subframe pattern (subframe pattern) information, and represent an time interval from when the spectrum is released to when the spectrum is acquired next time, where the regularity is periodical, and the period is determined through negotiation between systems sharing the unlicensed spectrum), a time reserved for another device to use the unlicensed spectrum (for example, the reserved time may be time information included in a request to send (RTS, request to send) or clear to send (CTS, clear to send) frame that is sent by an inter-system device in a net allocation vector (NAV, Net Allocation Vector) manner), or a silent time of a system, in which the base station is located, in the unlicensed spectrum (the silent time refers to a period in which the LTE system does not send any information, so that other systems contend for the spectrum, and in this period, another system may occupy or not occupy the spectrum). Certainly, in specific implementation, the user equipment may also directly receive the time information included in the request to send (RTS, request to send) or clear to send (CTS, clear to send) frame that is sent by the inter-system device in the net allocation vector (NAV, Net Allocation Vector) manner, and use the received time information as the release time of the unlicensed spectrum.

Manner 3: The user equipment receives an indication that is sent by the base station and that indicates that the unlicensed spectrum has been released, calculates, according to the release indication and a preset rule, a time for which the base station releases the unlicensed spectrum, and compares the release time obtained through calculation with a preset time threshold to determine whether the received release time exceeds the preset time threshold (for example, when the base station detects that a device having a high priority, such as a radar, occupies the unlicensed spectrum, the base station sends a special release indication to the UE, or adds information about a type of an inter-system to the release indication, and the UE knows according to a spectrum regulation that a long release time is required, for example, at least two hours).

In specific implementation, the data processing process in the present invention may include a hybrid automatic repeat request HARQ process; in step S111, the pausing, by the user equipment, a data processing process attached to the unlicensed spectrum includes: executing, by the user equipment, at least one of the following operations attached to the unlicensed spectrum: pausing listening on a physical downlink control channel, pausing downlink receiving, pausing uplink sending, reserving an HARQ buffer, pausing receiving downlink HARQ retransmission, pausing receiving downlink HARQ feedback information, pausing sending uplink HARQ retransmission, or pausing sending uplink HARQ feedback information.

In specific implementation, downlink receiving includes, but not limited to: a PDCCH, a downlink transport block (TB, transport block) on a physical downlink shared channel (PDSCH, physical downlink shared channel), HARQ feedback information acknowledgment information ACK or non-acknowledgement information NACK on a physical hybrid automatic repeat request indication channel (PHICH, physical HARQ indication channel), a primary synchronization signal (PSS, primary synchronization signal), a secondary synchronization reference signal (SSS, secondary synchronization), a cell reference signal (CRS, cell reference signal), a channel state information reference signal (CSI-RS, channel state information reference signal), a demodulation reference signal (DMRS, demodulation reference signal), a master information block (MIB, master information block) on a broadcast channel (BCH, broadcast channel), a system information block (system information block) on the PDSCH, and information related to a multimedia broadcast multicast system (MBMS, multimedia broadcast multicast system).

In specific implementation, the uplink sending includes, but not limited to: sending uplink control information (UCI, uplink control information) on a physical uplink control channel (PUCCH, physical uplink control channel) or a physical uplink shared channel (PUSCH, physical uplink shared channel), sending a transport block on the PUSCH, sending an uplink sounding reference signal (SRS, sounding reference signal), sending a demodulation reference signal DMRS, and sending a preamble (preamble) on a physical random access channel (PRACH, physical random access channel), where the UCI information includes, but not limited to: HARQ feedback information acknowledgement information ACK or non-acknowledgement information NACK, a channel quality indication (CQI, channel quality indication), a precoding matrix indication (PMI, Pre-coding matrix Indication), a rank indication (RI, ranking indication), and a precoding type indicator (PTI, precoding type indication).

In specific implementation, if the UE fails in receiving a downlink transport block TB before the LTE releases the unlicensed spectrum, and the UE is not able to send the HARQ feedback information ACK or NACK on the physical uplink control channel PUCCH or physical uplink shared channel PUSCH, when the LTE releases the unlicensed spectrum, the UE may not send the HARQ feedback information or listen on the physical downlink control channel PDCCH, so as to receive downlink HARQ retransmission. In addition, the UE may reserve, in a downlink HARQ soft buffer (soft buffer), a redundancy version (RV, redundancy version) of the received downlink transport block, to combine a redundancy version of a downlink transport block that is sent by the base station by means of HARQ retransmission after the LTE re-acquires the unlicensed spectrum.

In specific implementation, if the UE sends an uplink transport block TB before the LTE releases the unlicensed spectrum, but the UE is not able to receive the HARQ feedback information ACK or NACK that is sent by the base station on the physical hybrid automatic repeat request indication channel PHICH, the UE may not receive a PHICH in a subframe (subframe) in which the PHICH needs to be received when the LTE releases the unlicensed spectrum, and considers that the information on the PHICH is an ACK. The UE reserves data in the uplink HARQ buffer, to perform uplink HARQ retransmission according to an uplink grant (UL grant) of the base station after the LTE re-acquires the unlicensed spectrum, or generate a new uplink transport block according to an uplink grant of the base station and send the uplink transport block.

In specific implementation, if the UE sends an uplink transport block before the LTE releases the unlicensed spectrum, and receives the HARQ feedback information NACK that is sent by the base station on the physical hybrid automatic repeat request indication channel PHICH, the UE may not perform uplink HARQ retransmission in a subframe in which HARQ retransmission needs to be performed on the PUSCH when the LTE releases the unlicensed spectrum. The UE reserves the data in the uplink HARQ buffer, to perform adaptive uplink HARQ retransmission, or perform non adaptive (non adaptive) HARQ retransmission according to an uplink grant (UL grant) of the base station after the LTE re-acquires the unlicensed spectrum.

The data processing process in the present invention may include a hybrid automatic repeat request HARQ process, and in step S111, the resuming, by the user equipment, the data processing process after the base station re-acquires the unlicensed spectrum includes:

after the base station re-acquires the unlicensed spectrum, executing, by the user equipment, at least one of the following operations attached to the unlicensed spectrum: resuming listening on the physical downlink control channel, resuming downlink receiving, resuming uplink sending, resuming receiving downlink HARQ retransmission, resuming receiving downlink HARQ feedback information, resuming sending uplink HARQ retransmission, or resuming sending uplink HARQ feedback information. For example, when the time duration for which the unlicensed spectrum is released is monitored by using a wait timer, if before the wait timer times out, the UE receives the indication, sent by the base station, of acquiring the unlicensed spectrum or receives synchronization indication information sent by the base station, or the UE itself detects that the LTE re-acquires the unlicensed spectrum, the UE stops the wait timer, and the UE may listen on the PDCCH, perform downlink receiving and uplink sending, and continue the HARQ operation performed before the unlicensed spectrum is released. For example, the UE receives the downlink HARQ retransmission or a new TB block sent by the base station, receives the uplink grant sent by the base station, to perform uplink HARQ retransmission, or generate a new TB block to perform uplink transmission, or perform uplink non adaptive HARQ retransmission.

It should be noted that, the "pausing" in this embodiment of the present invention may be replaced with "suspending", "temporarily canceling", "temporarily not performing", or the like, which means: temporarily stopping the data processing process attached to the unlicensed spectrum, but retaining a data processing process that is already performed, to subsequently continue the data processing process on the basis of the process that has been performed. The "resuming" in this embodiment of the present invention may be replaced with "continuing", "carrying on", or the like, which means: continuing the data processing process that is not completed during the pause.

In specific implementation, the data processing process in the present invention may include a hybrid automatic repeat request HARQ process, and in step S112, the terminating, by the user equipment, the data processing process attached to the unlicensed spectrum includes: executing, by the user equipment, an HARQ entity reset operation, or executing a deactivation operation for a cell using the unlicensed spectrum.

Using LTE-A as an example, the HARQ entity reset operation on the SCell includes, but not limited to, the following content:

clearing soft buffers of all downlink HARQ processes;

for each downlink HARQ process, using a transport block received next as the first transport block on the HARQ process and transmitting the transport block;

considering that an uplink time alignment timer (timeAlignmentTimer) times out, clearing an uplink HARQ buffer, and instructing a radio resource control layer (RRC, radio resource control) to release an SRS resource on the SCell in the unlicensed spectrum;

setting new data indicators (NDI, new data indicator) of all uplink HARQ processes to zero;

clearing a buffer used to send a random access procedure message 3 (msg3);

stopping all running timers;

stopping all random access procedures (random access procedure) running on the SCell; and releasing or abandoning a dedicated random access preamble related to the random access procedure on the SCell; and the operation related to the SCell deactivation includes:

skipping sending an SRS on the SCell;

skipping sending a CQI, a PMI, an RI, or a PTI for the SCell;

skipping sending information on an uplink shared channel (uplink shared channel) of the SCell;

skipping listening on the PDCCH on the SCell;

skipping listening on the PDCCH for the SCell; and if there is a random access procedure running on the SCell, abandoning the random access procedure.

In specific implementation, the data processing process in the present invention may include a hybrid automatic repeat request HARQ request, and in step S112, the user equipment executes the HARQ entity reset operation or executes the deactivation operation for the cell using the unlicensed spectrum; and the selecting a licensed spectrum to start a new data processing process, or after the base station re-acquires the unlicensed spectrum, starting a new data processing process includes:

selecting, by the user equipment, a licensed spectrum to start a new HARQ processing process, or after the base station re-acquires the unlicensed spectrum, starting a new HARQ processing process. For example, using the LTE-A as an example, the UE may select a PCell or an SCell in the licensed spectrum to send a MAC CE that has not been sent successfully before the LTE releases the unlicensed spectrum, where the MAC CE includes, but not limited to: an uplink MAC CE, such as a buffer status report (BSR, buffer status report) or a power headroom report (PHR, power headroom report). When the PCell or the SCell in the licensed spectrum is selected to send the uplink MAC CE, the UE re-generates a MAC CE, and performs transmission according to a new HARQ. Another transport block TB that has not been sent successfully before the LTE releases the unlicensed spectrum is retransmitted by using a high-layer radio link control (RLC, radio link control) layer or a new transport block may be directly generated to perform HARQ transmission on the PCell or the SCell in the licensed spectrum.

In specific implementation, the data processing process in the present invention may include a discontinuous reception DRX process, and in step S111, the pausing, by the user equipment, the data processing process attached to the unlicensed spectrum includes: executing, by the user equipment, at least one of the following operations attached to the unlicensed spectrum: maintaining normal running of each DRX timer (continue to run the timer and when the timer times out, stop the timer), maintaining normal running of each DRX timer but the user equipment does not time or count (continue to run the DRX timer, but the time of the DRX timer correspondingly prolongs the time duration for which the unlicensed spectrum is released), pausing listening on a physical downlink control channel, pausing downlink receiving, or pausing uplink sending.

In specific implementation, the DRX timer in this embodiment of the present invention may include an on duration timer (onDurationTimer), a discontinuous reception inactivity timer (drx-InactivityTimer), a discontinuous reception retransmission timer (drx-RetransmissionTimer), a hybrid automatic repeat request round trip timer (HARQ RTT Timer), a discontinuous reception short cycle timer (drxShortCycleTimer), or the like.

In specific implementation, in this embodiment, for the processing manners such as pausing listening on the physical downlink control channel, pausing downlink receiving, and pausing uplink sending, refer to related processing manners of the HARQ, and details are not described herein again.

In specific implementation, the data processing process in the present invention may include a discontinuous reception DRX process, and in step S111, the resuming, by the user equipment, the data processing process after the base station re-acquires the unlicensed spectrum includes:

executing, by the user equipment, at least one of the following operations attached to the unlicensed spectrum: after the base station re-acquires the unlicensed spectrum, resuming listening on the physical downlink control channel, resuming downlink receiving, or resuming uplink sending.

In specific implementation, in this embodiment, for the processing manners such as resuming listening on the physical downlink control channel, resuming downlink receiving, and resuming uplink sending, refer to related processing manners of the HARQ, and details are not described herein again.

It should be noted that, the "pausing" in this embodiment of the present invention may be replaced with "suspending", "temporarily canceling", "temporarily not performing", or the like, which means: temporarily stopping the data processing process attached to the unlicensed spectrum, but retaining a data processing process that is already performed, to subsequently continue the data processing process on the basis of the process that has been performed. The "resuming" in this embodiment of the present invention may be replaced with "continuing", "carrying on", or the like, which means: continuing the data processing process that is not completed during the pause.

In specific implementation, the data processing process in the present invention may include a discontinuous reception DRX process, and in step S112, the terminating, by the user equipment, the data processing process attached to the unlicensed spectrum includes:

executing, by the user equipment, at least one of the following operations attached to the unlicensed spectrum: executing an HARQ entity reset operation, executing a deactivation operation for a cell using the unlicensed spectrum, or stopping each DRX timer.

For the processing manners such as executing the HARQ entity reset operation and executing the deactivation operation for the cell using the unlicensed spectrum, refer to the related processing manners of the HARQ, and details are not described herein again.

When a cell in the unlicensed spectrum and a cell in the licensed spectrum use a same DRX parameter configuration and DRX operation, when terminating the data processing process attached to the unlicensed spectrum, the user equipment does not stop each DRX timer; or when a cell in the unlicensed spectrum and a cell in the licensed spectrum execute different DRX parameter configurations, when terminating the data processing process attached to the unlicensed spectrum, the user equipment stops each DRX timer.

For example, using the LTE-A as an example, when an SCell in the unlicensed spectrum executes a DRX operation independent from a PCell and an SCell in the licensed spectrum, that is, a DRX parameter configuration on the SCell and an active time of UE on the SCell are independent from a DRX parameter configuration and an active time of a carrier in the licensed spectrum, in step S112 in this embodiment of the present invention, each DRX timer is not stopped. When the SCell in the unlicensed spectrum and the PCell and the SCell in the licensed spectrum execute a common DRX operation (common DRX), where in the prior art, the common DRX operation refers to: the DRX parameter configuration on the PCell is reused as the DRX parameter configuration on each SCell, the UE has a same active time regularity on the SCell and the PCell, that is, SCells and PCells in an activated state are either in an active time (active time) or in an inactive time (inactive time). In this case, in step S112, the UE executes a deactivation operation for the SCell in the unlicensed spectrum or executes an HARQ reset operation, but does not stop each DRX timer, because normal running of the DRX operations on the PCell and another SCell in the licensed spectrum also needs to rely on a running status of the timer.

In the DRX processing method provided in this embodiment, the UE may perform corresponding processing according to the time duration for which the unlicensed spectrum is released, for example, process the DRX timer and listen on the PDCCH, so that the DRX operation can be performed or continued successfully during release of the unlicensed spectrum and after the LTE re-acquires the unlicensed spectrum, thereby achieving better power saving effect when the UE works in the unlicensed spectrum.

In specific implementation, the data processing process in this embodiment of the present invention includes an automatic repeat request ARQ process; and in step S111, the pausing, by the user equipment, a data processing process attached to the unlicensed spectrum includes:

executing, by the user equipment, at least one of the following operations attached to the unlicensed spectrum: suspending a reordering timer of a radio link control layer RLC or suspending a poll retransmit timer; and Using LTE-A as an example, in a case in which cells aggregated in CA are provided by a same LTE base station, information such as an RLC status report (RLC status report), an RLC protocol data unit (PDU) provided with a poll bit (poll), and an RLC PDU needing to be retransmitted may all be sent on the PCell or the SCell in the licensed spectrum or the SCell in the unlicensed spectrum; therefore, after the LTE temporarily releases the unlicensed spectrum, the UE and the base station may send the foregoing information on the PCell or the SCell in the licensed spectrum. However, in a case in which cells aggregated in CA are provided by different LTE base stations, if no other licensed spectrum is configured for a base station in which a cell providing an unlicensed spectrum is located, when the release time of the unlicensed spectrum is greater than a threshold, the UE and the base station may perform sending by using a cell provided by another base station.

In the 3GPP small cell enhancement (SCE, small cell enhancement) project, CA may be performed between base stations. A master base station (MeNB, master eNB) provides a PCell and zero to multiple SCells, and a secondary base station (SeNB, secondary eNB) provides one to multiple SCells. If the SeNB supports the uplink, a PUCCH needs to be configured for at least one SCell in the SeNB, and the SCell is a master cell in the SeNB. A user plane data radio bearer (data radio bearer) may be located on only the SeNB, and communication is performed by means of an S1-U interface between the SeNB and a serving gateway (SGW, serving gateway); the data radio bearer may be split (split) into two logical channels (logical channel) to separately perform data transmission with the UE by means of a wireless interface between the MeNB and the UE and a wireless interface between the SeNB and the UE, and communicate with a network by means of an S1-U interface between the MeNB and the SGW. If the SeNB provides only one master cell, and the master cell is in the unlicensed spectrum, the LTE needs to perform corresponding processing on the ARQ process after releasing the unlicensed spectrum. For example, before the LTE releases the unlicensed spectrum, the UE receives one or more downlink RLC protocol data unit (PDU, packet data unit) from the SeNB but is not able to send an RLC status report (RLC status report) to the base station to feed back a receiving status of the RLC PDU, where the RLC status report includes ACK information indicating that the RLC PDU is successfully received and/or NACK information indicating that receiving of the RLC PDU fails; and/or the UE sends one or more RLC PDUs to the SeNB, but does not receive an RLC status report sent by the SeNB, or the UE has received the RLC status report sent by the SeNB, but is not able to perform RLC PDU retransmission. All these cases involve an ARQ processing problem after the unlicensed spectrum is released.

Specifically, in step S111, for an RLC receiving entity, the UE suspends (suspend) a reordering timer (reordering timer) of the RLC layer (in specific implementation, the suspending herein may be pausing running, or may be continuing running of the timer but the timer does not time); for an RLC sending entity, if the UE already sends an RLC PDU provided with a poll bit to the SeNB and starts a poll retransmit timer (poll retransmit Timer), the UE suspends the poll retransmit timer. Correspondingly, the base station processes a related timer according to a method corresponding to the UE.

In specific implementation, the data processing process in this embodiment of the present invention includes an automatic repeat request ARQ process; and in step S111, the resuming, by the user equipment, the data processing process after the base station re-acquires the unlicensed spectrum includes:

after the base station re-acquires the unlicensed spectrum, executing, by the user equipment, at least one of the following operations attached to the unlicensed spectrum: resuming the reordering timer of the radio link control layer and triggering an RLC status report after the reordering timer times out; or resuming the poll retransmit timer, and after the poll retransmit timer times out, triggering retransmitting an RLC data unit provided with a poll bit or sending a new RLC data unit.

It should be noted that, the "resuming" in this embodiment of the present invention may be replaced with "continuing", "carrying on", or the like, which means: continuing the data processing process that is not completed during pausing, for example, continuing running a timer or continuing running of the timer from a time point of suspending.

In specific implementation, the data processing process in this embodiment of the present invention includes an automatic repeat request ARQ process; and in step S112, the terminating, by the user equipment, the data processing process attached to the unlicensed spectrum includes:

executing, by the user equipment, at least one of the following operations attached to the unlicensed spectrum: stopping a reordering timer or stopping a poll retransmit timer.

In specific implementation, the data processing process in this embodiment of the present invention includes an automatic repeat request ARQ process; and in step S112, the selecting a licensed spectrum to start a new data processing process, or after the base station re-acquires the unlicensed spectrum, starting a new data processing process includes:

selecting, by the user equipment, a licensed spectrum to start a new ARQ processing process, or after the base station re-acquires the unlicensed spectrum, starting a new ARQ processing process. For example, using the LTE-A as an example, the UE may select the PCell or the SCell, provided by the MeNB, in the licensed spectrum, to send and/or receive information related to the ARQ.

In the ARQ method after an unlicensed spectrum is released in this embodiment, an ARQ process on an RLC layer can run normally when the unlicensed spectrum is released, thereby avoiding TCP retransmission caused by a relatively long delay of ARQ retransmission, saving spectrum resources, and improving the system throughput.

In specific implementation, the data processing process in this embodiment of the present invention includes a random access procedure; and in step S111, the pausing, by the user equipment, a data processing process attached to the unlicensed spectrum includes:

executing, by the user equipment, at least one of the following operations attached to the unlicensed spectrum: suspending a random access response window (that is, pausing counting subframes of the random access response (RAR, random access response) window) or suspending a contention resolution timer (that is, pausing running of the contention resolution timer).

Specifically, when the UE waits for a random access response (RAR, random access response), the UE suspends (suspend) the RAR window (window), that is, pauses counting the subframes of the RAR window; if the UE waits for a contention resolution (CR, contention resolution) message, that is, a random access procedure message 4 (msg4), and starts the contention resolution timer (contention resolution timer), the UE temporarily suspends the contention resolution timer, that is, pauses running of the timer.

In specific implementation, the data processing process in this embodiment of the present invention includes a random access procedure; and in step S111, the resuming, by the user equipment, the data processing process after the base station re-acquires the unlicensed spectrum includes:

after the base station re-acquires the unlicensed spectrum, executing, by the user equipment, at least one of the following operations attached to the unlicensed spectrum: resuming the random access response window (that is, continuing counting from a time point of pausing) or resuming running of the contention resolution timer (that is, continuing counting from a time point of pausing).

In specific implementation, the data processing process in this embodiment of the present invention includes a random access procedure; and in step S112, the terminating, by the user equipment, the data processing process attached to the unlicensed spectrum includes:

executing, by the user equipment, at least one of the following operations attached to the unlicensed spectrum: stopping a random access response window and stopping waiting for a random access response message, or stopping a contention resolution timer and stopping waiting for a contention resolution message; and In specific implementation, the data processing process in this embodiment of the present invention includes a random access procedure; and in step S112, the selecting, by the user equipment, a licensed spectrum to start a new data processing process, or after the base station re-acquires the unlicensed spectrum, starting a new data processing process includes:

selecting, by the user equipment, a licensed spectrum to start a new random access procedure, or after the base station re-acquires the unlicensed spectrum, starting a new random access procedure. For example, the UE may trigger a new random access procedure after the LTE re-acquires the unlicensed spectrum, and the base station may perform triggering by means of a PDCCH or by means of a MAC layer of the UE by using the prior art.

In addition, in specific implementation, the following cases may also exist. If the base station or the UE already triggers the random access procedure, for example, the UE already sends a random access preamble, the LTE does not release the unlicensed spectrum, and continues to perform the random access procedure until the random access procedure is completed. Alternatively, for only a contention free (contention free) random access procedure, the UE continues to wait until the RAR window ends and the random access procedure is completed or fails, and then, the LTE releases the unlicensed spectrum. Alternatively, if the LTE releases the unlicensed spectrum after this random access attempt fails, the UE triggers a random access procedure after the LTE re-acquires the unlicensed spectrum resource. In this method, it is considered that a priority of the random access procedure is higher than a priority of releasing the unlicensed spectrum.

In specific implementation, the data processing process in this embodiment of the present invention includes a radio resource management (RRM, radio resource management) measurement (measurement) process;

in step S111, the pausing, by the user equipment, a data processing process attached to the unlicensed spectrum includes:

pausing, by the user equipment, the RRM measurement process. In specific implementation, the RRM measurement is: measuring reference signal received power (RSRP, reference signal received power) and/or reference signal received quality RSRQ (reference signal received quality) based on a CRS or CSI-RS or based on a DMRS. The base station configures, for the UE, that RRM measurement is performed for the SCell in the unlicensed spectrum; and in step S111, the resuming, by the user equipment, the data processing process after the base station re-acquires the unlicensed spectrum includes:

resuming, by the user equipment, the RRM measurement process.

In step S112, the terminating, by the user equipment, the data processing process attached to the unlicensed spectrum includes:

releasing, by the user equipment, an RRM measurement parameter; and the selecting, by the user equipment, a licensed spectrum to start a new data processing process, or after the base station re-acquires the unlicensed spectrum, starting a new data processing process includes:

selecting, by the user equipment, a licensed spectrum to start a new RRM measurement process, or after the base station re-acquires the unlicensed spectrum, starting a new RRM process.

In specific implementation, the data processing process in this embodiment of the present invention includes a channel state information (CSI, channel state information) measurement (measurement) process;

in step S111, the pausing, by the user equipment, a data processing process attached to the unlicensed spectrum includes: the pausing, by the user equipment, a data processing process attached to the unlicensed spectrum includes:

pausing, by the user equipment, the CSI measurement process; and in step S111, the resuming, by the user equipment, the data processing process after the base station re-acquires the unlicensed spectrum includes:

resuming, by the user equipment, the CSI measurement process.

In step S112, the terminating, by the user equipment, the data processing process attached to the unlicensed spectrum includes:

releasing, by the user equipment, a CSI measurement parameter; and the selecting, by the user equipment, a licensed spectrum to start a new data processing process, or after the base station re-acquires the unlicensed spectrum, starting a new data processing process includes:

selecting, by the user equipment, a licensed spectrum to start a new CSI measurement process, or after the base station re-acquires the unlicensed spectrum, starting a new CSI process.

In specific implementation, the CSI measurement in this embodiment of the present invention is channel state measurement based on a CRS or CSI-RS or based on a DMRS, and includes CQI, PMI, RI, PTI, or the like. The base station configures, for the UE, that CSI measurement is performed for the SCell in the unlicensed spectrum.

Certainly, in specific implementation, in this embodiment of the present invention, after determining the base station has released the unlicensed spectrum, the UE always executes: pausing the data processing process attached to the unlicensed spectrum, and resuming the data processing process after the base station re-acquires the unlicensed spectrum; or the UE always executes: terminating, by the user equipment, the data processing process attached to the unlicensed spectrum, and selecting a licensed spectrum to start a new data processing process, or after the base station re-acquires the unlicensed spectrum, starting a new data processing process. The UE does not use different processing solutions according to the time duration for which the unlicensed spectrum is released.

As can be seen from the above, in some embodiments of the present invention, when user equipment determines that a base station has released an unlicensed spectrum, the user equipment monitors release time for which the unlicensed spectrum is released, where the release time indicates a time interval from when the base station releases the unlicensed spectrum to when the base station re-acquires the unlicensed spectrum; when the release time does not exceed a time threshold, the user equipment pauses a data processing process attached to the unlicensed spectrum, and resumes the data processing process after the base station re-acquires the unlicensed spectrum, thereby ensuring normal resumption of a communication process after the unlicensed spectrum is re-acquired; and when the release time exceeds the time threshold, the user equipment terminates the data processing process attached to the unlicensed spectrum, and selects a licensed spectrum to start a new data processing process, or after the base station re-acquires the unlicensed spectrum, starts a new data processing process, thereby avoiding wastes of radio resources caused by delayed redundant retransmission, and avoiding an impact on a throughput or a communication failure caused by transmission control protocol retransmission due to an excessively large data packet transmission delay.

Correspondingly, the embodiments of the present invention disclose user equipment that can be configured to implement the process of the foregoing method embodiment. The following describes, by using an example with reference to FIG. 2 to FIG. 5, a schematic structural diagram of user equipment according to an embodiment of the present invention.

Figure 2:
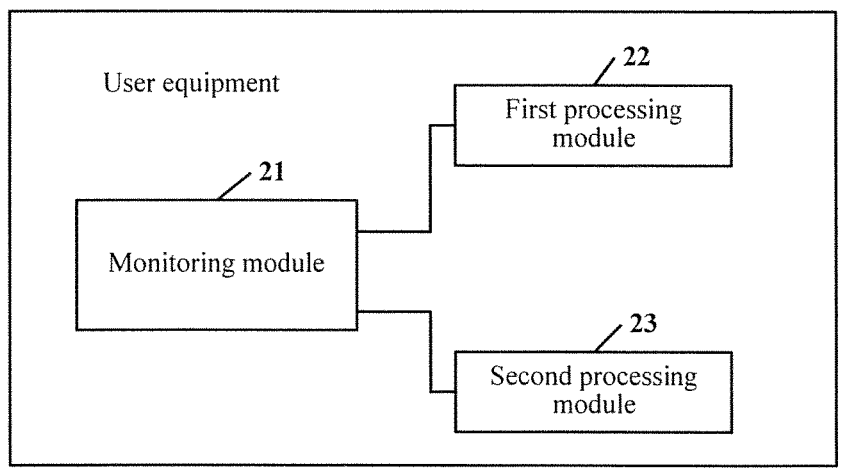
FIG. 2 is a schematic structural diagram of an embodiment of user equipment according to the embodiments of the present invention.

FIG. 2 is a schematic structural diagram of an embodiment of user equipment (UE) according to the present invention. As shown in FIG. 2, the user equipment may include a monitoring module 21, a first processing module 22, and a second processing module 23, where the monitoring module 21 is configured to: when the user equipment determines that a base station has released an unlicensed spectrum, monitor release time for which the unlicensed spectrum is released, where the release time indicates a time interval from when the base station releases the unlicensed spectrum to when the base station re-acquires the unlicensed spectrum;

the first processing module 22 is configured to: when the release time monitored by the monitoring module 21 does not exceed a time threshold, pause a data processing process attached to the unlicensed spectrum, and resume the data processing process after the base station re-acquires the unlicensed spectrum; and the second processing module 23 is configured to: when the release time monitored by the monitoring module 21 exceeds the time threshold, terminate the data processing process attached to the unlicensed spectrum, and select a licensed spectrum to start a new data processing process, or after the base station re-acquires the unlicensed spectrum, start a new data processing process.

Figure 3:
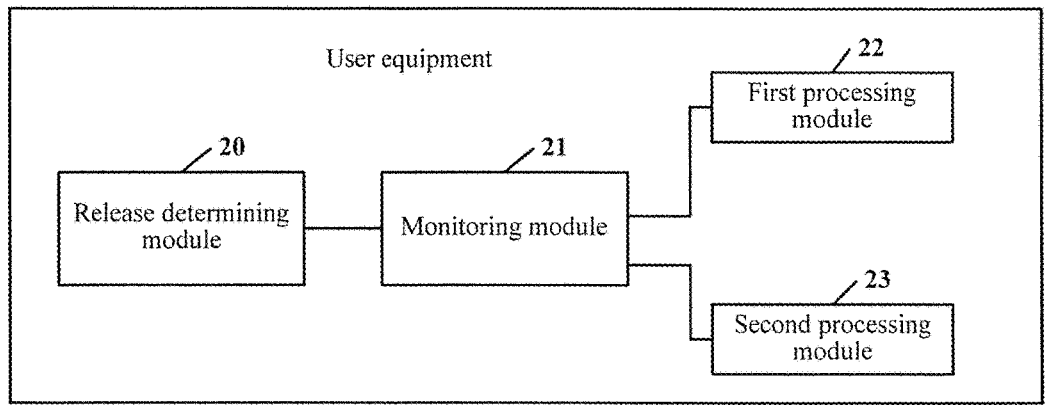
FIG. 3 is a schematic structural diagram of an embodiment of user equipment according to the embodiments of the present invention.

In specific implementation, as shown in FIG. 3, optionally, the user equipment in this embodiment of the present invention may further include: a release determining module 20, configured to: when indication information that is sent by the base station and that indicates that the unlicensed spectrum has been released is received, determine that the base station has released the unlicensed spectrum; or detect, according to a parameter of the base station, that the base station has released the unlicensed spectrum. Using an LTE-A system as an example, after the base station acquires the unlicensed spectrum, the base station and the user equipment (UE) communicate with each other by using a radio resource of an SCell. After the base station and the user equipment communicate with each other for a period of time, the base station releases the unlicensed spectrum, and the base station sends the indication information indicating that the unlicensed spectrum has been released to the UE, where the indication information may be sent by using a physical downlink control channel (including a physical downlink control channel (Physical downlink control channel, PDCCH) or an enhanced physical downlink control channel (enhanced physical downlink control channel, EPDCCH)), or may be sent by using a Medium Access Control control element (Medium access control control element, MAC CE). When the release determining module 20 of the UE receives the indication information that is sent by the base station by using the PDCCH or EPDCCH or MAC CE and that indicates that the unlicensed spectrum has been released, the UE can determine that the base station has released the unlicensed spectrum. Alternatively, the release determining module 20 of the UE detects, by measuring an LTE reference signal, that the base station has released the unlicensed spectrum.

Figure 4:
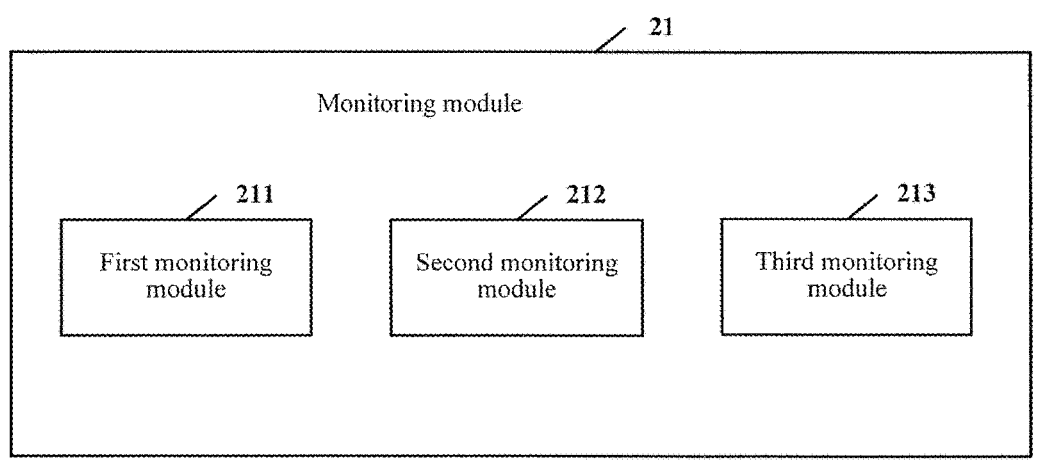
FIG. 4 is a schematic structural diagram of an embodiment of a monitoring module according to the embodiments of the present invention.

In specific implementation, as shown in FIG. 4, the monitoring module 21 may include a first monitoring module 211, a second monitoring module 212, and a third monitoring module 213.

The first monitoring module 211 is configured to start a wait timer to record the release time for which the unlicensed spectrum is released, and when the wait timer does not time out, determine that the release time does not exceed the time threshold, or after the wait timer times out, determine that the release time exceeds the time threshold. Still using the LTE-A system as an example, after the UE determines that the base station has released the unlicensed spectrum, the first monitoring module 211 starts a wait timer (which may be recorded as a wait-timer), to record the release time for which the unlicensed spectrum is released. Before the UE receives an indication that is sent by the base station and that indicates that the unlicensed spectrum has been re-acquired or if the UE does not detect that the base station has re-acquired the unlicensed spectrum, it indicates that the unlicensed spectrum is still in a release time period. Therefore, in this embodiment of the present invention, before the base station re-acquires the unlicensed spectrum and sends an indication to the UE, or before the UE detects that the base station has re-acquired the unlicensed spectrum (indicating that the release time of the unlicensed spectrum does not end), if the wait timer does not time out, the first monitoring module 211 determines that the release time does not exceed the time threshold. Before the base station re-acquires the unlicensed spectrum and sends an indication to the UE, or before the UE detects that the base station has re-acquired the unlicensed spectrum (indicating that the release time of the unlicensed spectrum does not end), if the wait timer times out, the first monitoring module 211 determines that the release time exceeds the time threshold. In this manner, a time point when the wait timer times out is the time threshold. In specific implementation, the wait timer may be an independent timer, or re-use a deactivation timer (sCellDeactivationTimer) in the prior art. After the UE receives an indication, of the base station, indicating that the unlicensed spectrum has been released or the UE itself detects that the unlicensed spectrum is released, the UE may start or restart the deactivation timer, or the UE continues to maintain the deactivation timer if the deactivation timer already runs. Before the deactivation timer times out, the UE determines that the release time does not exceed the time threshold. After the deactivation timer times out, the UE determines that the release time exceeds the time threshold.

The second monitoring module 212 is configured to receive a specific release time, sent by the base station, of the unlicensed spectrum, and compare the received release time with a preset time threshold to determine whether the received release time exceeds the preset time threshold. In specific implementation, the specific release time of the unlicensed spectrum includes at least one of the following time: a time for which another device occupies the unlicensed spectrum (for example, when detecting that a device having a high priority, such as a radar, occupies the unlicensed spectrum, the base station sends a time for which the radar occupies the unlicensed spectrum to the UE), an interval period from when the unlicensed spectrum is released to when the unlicensed spectrum is acquired (for example, period information may be periodical subframe pattern (subframe pattern) information, and represent an time interval from when the spectrum is released to when the spectrum is acquired next time, where the regularity is periodical, and the period is determined through negotiation between systems sharing the unlicensed spectrum), a time reserved for another device to use the unlicensed spectrum (for example, the reserved time may be time information included in a request to send (RTS, request to send) or clear to send (CTS, clear to send) frame that is sent by an inter-system device in a net allocation vector (NAV, Net Allocation Vector) manner), or a silent time of a system, in which the base station is located, in the unlicensed spectrum (the silent time refers to a period in which the LTE system does not send any information, so that other systems contend for the spectrum, and in this period, another system may occupy or not occupy the spectrum). Certainly, in specific implementation, the user equipment may also directly receive the time information included in the request to send (RTS, request to send) or clear to send (CTS, clear to send) frame that is sent by the inter-system device in the net allocation vector (NAV, Net Allocation Vector) manner, and use the received time information as the release time of the unlicensed spectrum.

The third monitoring module 213 is configured to receive an indication that is sent by the base station and that indicates that the unlicensed spectrum has been released, calculates, according to the release indication and a preset rule, a time for which the base station releases the unlicensed spectrum, and compares the release time obtained through calculation with a preset time threshold to determine whether the received release time exceeds the preset time threshold (for example, when the base station detects that a device having a high priority, such as a radar, occupies the unlicensed spectrum, the base station sends a special release indication to the UE, or adds information about a type of an inter-system to the release indication, and the UE knows, according to a spectrum regulation, that a long release time is required, for example, at least two hours).

In specific implementation, the data processing process in the present invention includes a hybrid automatic repeat request HARQ process, and the first processing module 22 is specifically configured to: when the release time monitored by the monitoring module 21 does not exceed the time threshold, execute at least one of the following operations attached to the unlicensed spectrum: pausing listening on a physical downlink control channel, pausing downlink receiving, pausing uplink sending, reserving an HARQ buffer, pausing receiving downlink HARQ retransmission, pausing receiving downlink HARQ feedback information, pausing sending uplink HARQ retransmission, or pausing sending uplink HARQ feedback information; and after the base station re-acquires the unlicensed spectrum, execute at least one of the following operations attached to the unlicensed spectrum: resuming listening on the physical downlink control channel, resuming downlink receiving, resuming uplink sending, resuming receiving downlink HARQ retransmission, resuming receiving downlink HARQ feedback information, resuming sending uplink HARQ retransmission, or resuming sending uplink HARQ feedback information.

In specific implementation, downlink receiving includes, but not limited to: a PDCCH, a downlink transport block (TB, transport block) on a physical downlink shared channel (PDSCH, physical downlink shared channel), HARQ feedback information acknowledgment information ACK or non-acknowledgement information NACK on a physical hybrid automatic repeat request indication channel (PHICH, physical HARQ indication channel), a primary synchronization signal (PSS, primary synchronization signal), a secondary synchronization reference signal (SSS, secondary synchronization), a cell reference signal (CRS, cell reference signal), a channel state information reference signal (CSI-RS, channel state information reference signal), a demodulation reference signal (DMRS, demodulation reference signal), a master information block (MIB, master information block) on a broadcast channel (BCH, broadcast channel), a system information block (system infatuation block) on the PDSCH, and information related to a multimedia broadcast multicast system (MBMS, multimedia broadcast multicast system).

In specific implementation, the uplink sending includes, but not limited to: sending uplink control information (UCI, uplink control information) on a physical uplink control channel (PUCCH, physical uplink control channel) or a physical uplink shared channel (PUSCH, physical uplink shared channel), sending a transport block on the PUSCH, sending an uplink sounding reference signal (SRS, sounding reference signal), sending a demodulation reference signal DMRS, and sending a preamble (preamble) on a physical random access channel (PRACH, physical random access channel), where the UCI information includes, but not limited to: HARQ feedback information acknowledgement information ACK or non-acknowledgement information NACK, a channel quality indication (CQI, channel quality indication), a precoding matrix indication (PMI, Pre-coding matrix Indication), a rank indication (RI, ranking indication), and a precoding type indicator (PTI, precoding type indication).

In specific implementation, if the UE fails in receiving a downlink transport block TB before the LTE releases the unlicensed spectrum, and the UE is not able to send the HARQ feedback information ACK or NACK on the physical uplink control channel PUCCH or physical uplink shared channel PUSCH, when the LTE releases the unlicensed spectrum, the UE may not send the HARQ feedback information or listen on the physical downlink control channel PDCCH, so as to receive downlink HARQ retransmission. In addition, the UE may reserve, in a downlink HARQ soft buffer (soft buffer), a redundancy version (RV, redundancy version) of the received downlink transport block, to combine a redundancy version of a downlink transport block that is sent by the base station by means of HARQ retransmission after the LTE re-acquires the unlicensed spectrum.

In specific implementation, if the UE sends an uplink transport block TB before the LTE releases the unlicensed spectrum, but the UE is not able to receive the HARQ feedback information ACK or NACK that is sent by the base station on the physical hybrid automatic repeat request indication channel PHICH, the UE may not receive a PHICH in a subframe (subframe) in which the PHICH needs to be received when the LTE releases the unlicensed spectrum, and considers that the information on the PHICH is an ACK. The UE reserves data in the uplink HARQ buffer, to perform uplink HARQ retransmission according to an uplink grant (UL grant) of the base station after the LTE re-acquires the unlicensed spectrum, or generate a new uplink transport block according to an uplink grant of the base station and send the uplink transport block.

In specific implementation, if the UE sends an uplink transport block before the LTE releases the unlicensed spectrum, and receives the HARQ feedback information NACK that is sent by the base station on the physical hybrid automatic repeat request indication channel PHICH, the UE may not perform uplink HARQ retransmission in a subframe in which HARQ retransmission needs to be performed on the PUSCH when the LTE releases the unlicensed spectrum. The UE reserves the data in the uplink HARQ buffer, to perform adaptive uplink HARQ retransmission, or perform non adaptive (non adaptive) HARQ retransmission according to an uplink grant (UL grant) of the base station after the LTE re-acquires the unlicensed spectrum.

In specific implementation, that the time duration for which the unlicensed spectrum is released is monitored by using a wait timer is used as an example, if before the wait timer times out, the UE receives the indication, sent by the base station, of acquiring the unlicensed spectrum or receives synchronization indication information sent by the base station (that is, the base station re-acquires the unlicensed spectrum), or the UE itself detects that the LTE re-acquires the unlicensed spectrum, the first processing module 22 of the UE stops the wait timer, listens on the PDCCH, perform is downlink receiving and uplink sending, and continues the HARQ operation performed before the unlicensed spectrum is released. For example, the UE receives downlink HARQ retransmission or a new TB block sent by the base station, receives the uplink grant sent by the base station, to perform uplink HARQ retransmission, generate a new TB block to perform uplink transmission, or perform uplink non adaptive HARQ retransmission.

It should be noted that, the "pausing" in this embodiment of the present invention may be replaced with "suspending", "temporarily canceling", "temporarily not performing", or the like, which means: temporarily stopping the data processing process attached to the unlicensed spectrum, but retaining a data processing process that is already performed, to subsequently continue the data processing process on the basis of the process that has been performed. The "resuming" in this embodiment of the present invention may be replaced with "continuing", "carrying on", or the like, which means: continuing the data processing process that is not completed during the pause.

In specific implementation, the data processing process includes a hybrid automatic repeat request HARQ process, and the second processing module 23 is specifically configured to: when the release time monitored by the monitoring module 21 exceeds the time threshold, execute an HARQ entity reset operation, or execute a deactivation operation for a cell using the unlicensed spectrum; and select a licensed spectrum to start a new HARQ processing process, or after the base station re-acquires the unlicensed spectrum, start a new HARQ processing process.

In specific implementation, using LTE-A as an example, the HARQ entity reset operation on the SCell includes, but not limited to, the following content:

clearing soft buffers of all downlink HARQ processes;

for each downlink HARQ process, using a transport block received next as the first transport block on the HARQ process and transmitting the transport block;

considering that an uplink time alignment timer (time-AlignmentTimer) times out, clearing an uplink HARQ buffer, and instructing a radio resource control layer (RRC, radio resource control) to release an SRS resource on the SCell in the unlicensed spectrum;

setting new data indicators (NDI, new data indicator) of all uplink HARQ processes to zero;

clearing a buffer used to send a random access procedure message 3 (msg3);

stopping all running timers;

stopping all random access procedures (random access procedure) running on the SCell; and releasing or abandoning a dedicated random access preamble related to the random access procedure on the SCell; and the operation related to the SCell deactivation includes:

skipping sending an SRS on the SCell;

skipping sending a CQI, a PMI, an RI, or a PTI for the SCell;

skipping sending information on an uplink shared channel (uplink shared channel) of the SCell;

skipping listening on the PDCCH on the SCell;

skipping listening on the PDCCH for the SCell; and if there is a random access procedure running on the SCell, abandoning the random access procedure.

The second processing module 23 selects a licensed spectrum to start a new HARQ processing process, or after the base station re-acquires the unlicensed spectrum, starts a new HARQ processing process. Using the LTE-A as an example, the second processing module 23 of the UE may select a PCell or an SCell in the licensed spectrum to send a MAC CE that has not been sent successfully before the LTE releases the unlicensed spectrum, where the MAC CE includes, but not limited to: an uplink MAC CE, such as a buffer status report (BSR, buffer status report) or a power headroom report (PHR, power headroom report). When the PCell or the SCell in the licensed spectrum is selected to send the uplink MAC CE, the UE re-generates a MAC CE, and performs transmission according to a new HARQ. Another transport block TB that has not been sent successfully before the LTE releases the unlicensed spectrum is retransmitted by using a high-layer radio link control (RLC, radio link control) layer or a new transport block may be directly generated to perform HARQ transmission on the PCell or the SCell in the licensed spectrum.

In specific implementation, the data processing process includes a discontinuous reception DRX process, and the first processing module 22 is specifically configured to: when the release time monitored by the monitoring module 21 does not exceed the time threshold, execute at least one of the following operations attached to the unlicensed spectrum: maintaining normal running of each DRX timer (continue to run the timer and when the timer times out, stop the timer), maintaining normal running of each DRX timer but the user equipment does not perform timing or counting (continue to run the DRX timer, but the DRX timer correspondingly prolongs the time duration for which the unlicensed spectrum is released), pausing listening on a physical downlink control channel, pausing downlink receiving, or pausing uplink sending; and after the base station re-acquires the unlicensed spectrum, execute at least one of the following operations attached to the unlicensed spectrum: after the base station re-acquires the unlicensed spectrum, resuming listening on the physical downlink control channel, resuming downlink receiving, or resuming uplink sending.

In specific implementation, the DRX timer in this embodiment of the present invention may include an on duration timer (onDurationTimer), a discontinuous reception inactivity timer (drx-InactivityTimer), a discontinuous reception retransmission timer (drx-RetransmissionTimer), a hybrid automatic repeat request round trip timer (HARQ RTT Timer), a discontinuous reception short cycle timer (drxShortCycleTimer), or the like.

In specific implementation, in this embodiment, for the processing manners such as pausing listening on the physical downlink control channel, pausing downlink receiving, and pausing uplink sending, refer to related processing manners of the HARQ, and details are not described herein again.

In specific implementation, in this embodiment, for the processing manners such as resuming listening on the physical downlink control channel, resuming downlink receiving, and resuming uplink sending, refer to related processing manners of the HARQ, and details are not described herein again.

It should be noted that, the "pausing" in this embodiment of the present invention may be replaced with "suspending", "temporarily canceling", "temporarily not performing", or the like, which means: temporarily stopping the data processing process attached to the unlicensed spectrum, but retaining a data processing process that is already performed, to subsequently continue the data processing process on the basis of the process that has been performed. The "resuming" in this embodiment of the present invention may be replaced with "continuing", "carrying on", or the like, which means: continuing the data processing process that is not completed during the pause.

In specific implementation, the data processing process includes a discontinuous reception DRX process, and the second processing module 23 is specifically configured to: when the release time monitored by the monitoring module 21 exceeds the time threshold, execute at least one of the following operations attached to the unlicensed spectrum: executing an HARQ entity reset operation, executing a deactivation operation for a cell using the unlicensed spectrum, or stopping each DRX timer; and select a licensed spectrum to start a new DRX processing process, or maintain a DRX processing process running in a licensed spectrum, or after the base station re-acquires the unlicensed spectrum, start a new DRX processing process.

For the processing manners such as executing the HARQ entity reset operation and executing the deactivation operation for the cell using the unlicensed spectrum, refer to the related processing manners of the HARQ, and details are not described herein again.

In specific implementation, when a cell in the unlicensed spectrum and a cell in the licensed spectrum use a same DRX parameter configuration and DRX operation, when terminating the data processing process attached to the unlicensed spectrum, the second processing module 23 does not stop each DRX timer; or when a cell in the unlicensed spectrum and a cell in the licensed spectrum execute different DRX parameter configurations, when terminating the data processing process attached to the unlicensed spectrum, the second processing module 23 stops each DRX timer.

For example, using the LTE-A as an example, when an SCell in the unlicensed spectrum executes a DRX operation independent from a PCell and an SCell in the licensed spectrum, that is, a DRX parameter configuration on the SCell and an active time of UE on the SCell are independent from a DRX parameter configuration and an active time of a carrier in the licensed spectrum, in this embodiment of the present invention, the second processing module 23 does not stop each DRX timer. When the SCell in the unlicensed spectrum and the PCell and the SCell in the licensed spectrum execute a common DRX operation (common DRX), where in the prior art, the common DRX operation refers to: the DRX parameter configuration on the PCell is reused as the DRX parameter configuration on each SCell, the UE has a same active time regularity on the SCell and the PCell, that is, SCells and PCells in an activated state are either in an active time (active time) or in an inactive time (inactive time). In this case, the second processing module 23 executes a deactivation operation for the SCell in the unlicensed spectrum or an HARQ reset operation, but does not stop each DRX timer, because normal running of the DRX operations on the PCell and another SCell in the licensed spectrum also needs to rely on a running status of the timer.

In the DRX processing solution provided in this embodiment, the UE may perform corresponding processing according to the time duration for which the unlicensed spectrum is released, for example, process the DRX timer and listen on the PDCCH, so that the DRX operation can be performed or continued successfully during release of the unlicensed spectrum and after the LTE re-acquires the unlicensed spectrum, thereby achieving better power saving effect when the UE works in the unlicensed spectrum.

In specific implementation, the data processing process includes an automatic repeat request ARQ process, and the first processing module 22 is specifically configured to: when the release time monitored by the monitoring module 21 does not exceed the time threshold, execute at least one of the following operations attached to the unlicensed spectrum: suspending a reordering timer of a radio link control layer RLC or suspending a poll retransmit timer; and after the base station re-acquires the unlicensed spectrum, execute at least one of the following operations attached to the unlicensed spectrum: resuming the reordering timer of the radio link control layer and triggering an RLC status report after the reordering timer times out; or resuming the poll retransmit timer, and after the poll retransmit timer times out, triggering retransmitting an RLC data unit provided with a poll bit or sending a new RLC data unit.

Using LTE-A as an example, in a case in which cells aggregated in CA are provided by a same LTE base station, information such as an RLC status report (RLC status report), an RLC protocol data unit (PDU) provided with a poll bit (poll), and an RLC PDU needing to be retransmitted may all be sent on the PCell or the SCell in the licensed spectrum or the SCell in the unlicensed spectrum; therefore, after the LTE temporarily releases the unlicensed spectrum, the UE and the base station may send the foregoing information on the PCell or the SCell in the licensed spectrum. However, in a case in which cells aggregated in CA are provided by different LTE base stations, if no other licensed spectrum is configured for a base station in which a cell providing an unlicensed spectrum is located, when the release time of the unlicensed spectrum is greater than a threshold, the UE and the base station may perform sending by using a cell provided by another base station.

In the 3GPP small cell enhancement (SCE, small cell enhancement) project, CA may be performed between base stations. A master base station (MeNB, master eNB) provides a PCell and zero to multiple SCells, and a secondary base station (SeNB, secondary eNB) provides one to multiple SCells. If the SeNB supports the uplink, a PUCCH needs to be configured for at least one SCell in the SeNB, and the SCell is a master cell in the SeNB. A user plane data radio bearer (data radio bearer) may be located on only the SeNB, and communication is performed by means of an S1-U interface between the SeNB and a serving gateway (SGW, serving gateway); the data radio bearer may be split (split) into two logical channels (logical channel) to separately perform data transmission with the UE by means of a wireless interface between the MeNB and the UE and a wireless interface between the SeNB and the UE, and communicate with a network by means of an S1-U interface between the MeNB and the SGW. If the SeNB provides only one master cell, and the master cell is in the unlicensed spectrum, the LTE needs to perform corresponding processing on the ARQ process after releasing the unlicensed spectrum. For example, before the LTE releases the unlicensed spectrum, the UE receives one or more downlink RLC protocol data unit (PDU, packet data unit) from the SeNB but is not able to send an RLC status report (RLC status report) to the base station to feed back a receiving status of the RLC PDU, where the RLC status report includes ACK information indicating that the RLC PDU is successfully received and/or NACK information indicating that receiving of the RLC PDU fails; and/or the UE sends one or more RLC PDUs to the SeNB, but does not receive an RLC status report sent by the SeNB, or the UE has received the RLC status report sent by the SeNB, but is not able to perform RLC PDU retransmission. All these cases involve an ARQ processing problem after the unlicensed spectrum is released.

Specifically, for an RLC receiving entity, the first processing module 22 may suspend (suspend) a reordering timer (reordering timer) of the RLC layer (in specific implementation, the suspending herein may be pausing running, or may be continuing running of the timer but the timer does not time); for an RLC sending entity, if the UE already sends an RLC PDU provided with a poll bit to the SeNB and starts a poll retransmit timer (poll retransmit Timer), the first processing module 22 may suspend the poll retransmit timer. Correspondingly, the base station processes a related timer according to a method corresponding to the UE.

It should be noted that, the "resuming" in this embodiment of the present invention may be replaced with "continuing", "carrying on", or the like, which means: continuing the data processing process that is not completed during pausing, for example, continuing running a timer or continuing running of the timer from a time point of suspending.

In specific implementation, the data processing process includes an automatic repeat request ARQ process, and the second processing module 23 is specifically configured to: when the release time monitored by the monitoring module 21 exceeds the time threshold, execute at least one of the following operations attached to the unlicensed spectrum: stopping a reordering timer or stopping a poll retransmit timer; and select a licensed spectrum to start a new ARQ processing process, or after the base station re-acquires the unlicensed spectrum, start a new ARQ processing process. For example, using LTE-A as an example, when starting a new ARQ processing process, the second processing module 23 may select a PCell or an SCell in the licensed spectrum provided by a MeNB, to send and/or receive information related to the ARQ.

In the ARQ processing solution after an unlicensed spectrum is released in this embodiment, an ARQ process on an RLC layer can run normally when the unlicensed spectrum is released, thereby avoiding TCP retransmission caused by a relatively long delay of ARQ retransmission, saving spectrum resources, and improving the system throughput.

In specific implementation, the data processing process includes a random access procedure, and the first processing module 22 is specifically configured to: when the release time monitored by the monitoring module 21 does not exceed the time threshold, execute at least one of the following operations attached to the unlicensed spectrum: suspending a random access response window (that is, pausing counting subframes of a random access response (RAR, random access response) window) or suspending a contention resolution timer (that is, pausing running of the contention resolution timer); and after the base station re-acquires the unlicensed spectrum, execute at least one of the following operations attached to the unlicensed spectrum: resuming the random access response window (that is, continuing counting from a time point of pausing) or resuming running of the contention resolution timer (that is, continuing counting from a time point of pausing).

Specifically, when the UE waits for a random access response (RAR, random access response), the first processing module 22 of the UE may suspend (suspend) the RAR window (window), that is, pause counting the subframes of the RAR window; if the UE waits for a contention resolution (CR, contention resolution) message, that is, a random access procedure message 4 (msg4), and starts the contention resolution timer (contention resolution timer), the first processing module 22 of the UE may temporarily suspend the contention resolution timer, that is, pause running of the timer.

In specific implementation, the data processing process includes a random access procedure, and the second processing module 23 is specifically configured to: when the release time monitored by the monitoring module 21 exceeds the time threshold, execute at least one of the following operations attached to the unlicensed spectrum: stopping a random access response window and stopping waiting for a random access response message, or stopping a contention resolution timer and stopping waiting for a contention resolution message; and select a licensed spectrum to start a new random access procedure, or after the base station re-acquires the unlicensed spectrum, start a new random access procedure. For example, when starting a new random access procedure, the second processing module 23 of the UE may trigger a new random access procedure after the LTE re-acquires the unlicensed spectrum. The base station may perform triggering by means of a PDCCH or by means of a MAC layer of the UE by using the prior art.

In specific implementation, the data processing process includes a radio resource management RRM measurement process, and the first processing module 22 is specifically configured to: when the release time monitored by the monitoring module 21 does not exceed the time threshold, pause the RRM measurement process; and after the base station re-acquires the unlicensed spectrum, resume the RRM measurement process. In specific implementation, the RRM measurement is: measuring reference signal received power (RSRP, reference signal received power) and/or reference signal received quality RSRQ (reference signal received quality) based on a CRS or CSI-RS or based on a DMRS. The base station configures, for the UE, that RRM measurement is performed for the SCell in the unlicensed spectrum.

In specific implementation, the data processing process includes a radio resource management RRM measurement process, and the second processing module 23 is specifically configured to: when the release time monitored by the monitoring module 21 exceeds the time threshold, release an RRM measurement parameter; and select a licensed spectrum to start a new RRM measurement process, or after the base station re-acquires the unlicensed spectrum, start a new RRM process.

In specific implementation, the data processing process includes a channel state information CSI measurement process, and the first processing module 22 is specifically configured to: when the release time monitored by the monitoring module 21 does not exceed the time threshold, pause the CSI measurement process; and after the base station re-acquires the unlicensed spectrum, resume the CSI measurement process. In specific implementation, the CSI measurement in this embodiment of the present invention is channel state measurement based on a CRS or CSI-RS or based on a DMRS, and includes CQI, PMI, RI, PTI, or the like. The base station configures, for the UE, that CSI measurement is performed for the SCell in the unlicensed spectrum.

In specific implementation, the data processing process includes a channel state information CSI measurement process, and the second processing module 23 is specifically configured to: when the release time monitored by the monitoring module 21 exceeds the time threshold, release a CSI measurement parameter; and select a licensed spectrum to start a new CSI measurement process, or after the base station re-acquires the unlicensed spectrum, start a new CSI process.

Certainly, in specific implementation, in this embodiment of the present invention, after determining that the base station has released the unlicensed spectrum, the UE always executes the following operations by using the first processing module 22: pausing the data processing process attached to the unlicensed spectrum, and resuming the data processing process after the base station re-acquires the unlicensed spectrum; or the UE always executes the following operations by using the second processing module 23: terminating, by the user equipment, the data processing process attached to the unlicensed spectrum, and selecting a licensed spectrum to start a new data processing process, or after the base station re-acquires the unlicensed spectrum, starting a new data processing process. The UE does not use different processing solutions according to the time duration for which the unlicensed spectrum is released.

As can be seen from the above, in some embodiments of the present invention, when user equipment determines that a base station has released an unlicensed spectrum, the user equipment monitors release time for which the unlicensed spectrum is released, where the release time indicates a time interval from when the base station releases the unlicensed spectrum to when the base station re-acquires the unlicensed spectrum; when the release time does not exceed a time threshold, the user equipment pauses a data processing process attached to the unlicensed spectrum, and resumes the data processing process after the base station re-acquires the unlicensed spectrum, thereby ensuring normal resumption of a communication process after the unlicensed spectrum is re-acquired; and when the release time exceeds the time threshold, the user equipment terminates the data processing process attached to the unlicensed spectrum, and selects a licensed spectrum to start a new data processing process, or after the base station re-acquires the unlicensed spectrum, starts a new data processing process, thereby avoiding wastes of radio resources caused by delayed redundant retransmission, and avoiding an impact on a throughput or a communication failure caused by transmission control protocol retransmission due to an excessively large data packet transmission delay.

Figure 5:
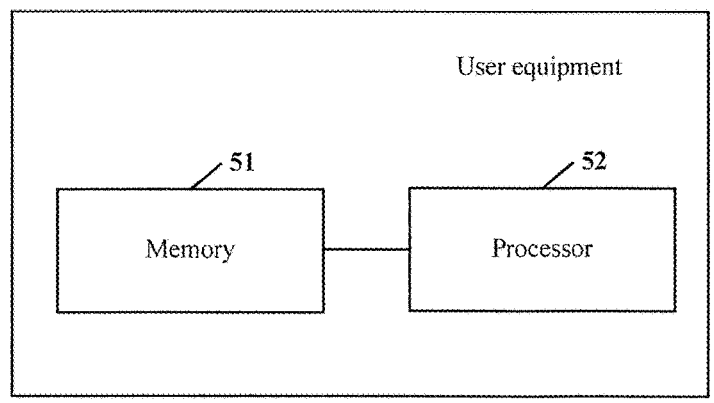
FIG. 5 is a schematic structural diagram of an embodiment of user equipment according to the embodiments of the present invention.

FIG. 5 is a schematic structural diagram of another embodiment of user equipment according to the present invention. As shown in FIG. 5, the user equipment may include a memory 51 and a processor 52, where the processor 52 invokes a program stored in the memory 51, and executes the following process:

when the user equipment determines that a base station has released an unlicensed spectrum, monitoring release time for which the unlicensed spectrum is released, where the release time indicates a time interval from when the base station releases the unlicensed spectrum to when the base station re-acquires the unlicensed spectrum;

when the release time does not exceed a time threshold, pausing a data processing process attached to the unlicensed spectrum, and resuming the data processing process after the base station re-acquires the unlicensed spectrum; and when the release time exceeds the time threshold, terminating the data processing process attached to the unlicensed spectrum, and selecting a licensed spectrum to start a new data processing process, or after the base station re-acquires the unlicensed spectrum, starting a new data processing process.

In some feasible implementation manners, that the processor 52 determines that a base station has released an unlicensed spectrum includes:

when the user equipment receives indication information that is sent by the base station and that indicates that the unlicensed spectrum has been released, the processor 52 determines that the base station has released the unlicensed spectrum;

or the processor 52 detects, according to a parameter of the base station, that the base station has released the unlicensed spectrum.

In some feasible implementation manners, the monitoring, by the processor 52, release time for which the unlicensed spectrum is released includes:

starting, by the processor 52, a wait timer to record the release time for which the unlicensed spectrum is released, and when the wait timer does not time out, determining that the release time does not exceed the time threshold, or after the wait timer times out, determining that the release time exceeds the time threshold; or receiving, by the processor 52, a specific release time, sent by the base station, of the unlicensed spectrum, and comparing the received release time with a preset time threshold to determine whether the received release time exceeds the preset time threshold; or receiving, by the processor 52, an indication that is sent by the base station and that indicates that the unlicensed spectrum has been released, calculating a release time of the base station for the unlicensed spectrum according to the release indication and a preset rule, and comparing the release time obtained through calculation with a preset time threshold to determine whether the received release time exceeds the preset time threshold.

In some feasible implementation manners, the wait timer includes a deactivation timer, and the specific release time of the unlicensed spectrum includes at least one of the following time: a time for which another device occupies the unlicensed spectrum, a time reserved for another device to use the unlicensed spectrum, or a silent time of a system, in which the base station is located, in the unlicensed spectrum.

In some feasible implementation manners, the data processing process includes a hybrid automatic repeat request HARQ process;

the pausing, by the processor 52, a data processing process attached to the unlicensed spectrum includes:

executing, by the processor 52, at least one of the following operations attached to the unlicensed spectrum: pausing listening on a physical downlink control channel, pausing downlink receiving, pausing uplink sending, reserving an HARQ buffer, pausing receiving downlink HARQ retransmission, pausing receiving downlink HARQ feedback information, pausing sending uplink HARQ retransmission, or pausing sending uplink HARQ feedback information; and the resuming, by the processor 52, the data processing process after the base station re-acquires the unlicensed spectrum includes:

after the base station re-acquires the unlicensed spectrum, executing, by the processor 52, at least one of the following operations attached to the unlicensed spectrum: resuming listening on the physical downlink control channel, resuming downlink receiving, resuming uplink sending, resuming receiving downlink HARQ retransmission, resuming receiving downlink HARQ feedback information, resuming sending uplink HARQ retransmission, or resuming sending uplink HARQ feedback information.

In some feasible implementation manners, the data processing process includes a hybrid automatic repeat request HARQ process;

the terminating, by the processor 52, the data processing process attached to the unlicensed spectrum includes:

executing, by the processor 52, an HARQ entity reset operation, or executing a deactivation operation for a cell using the unlicensed spectrum; and the selecting a licensed spectrum to start a new data processing process, or after the base station re-acquires the unlicensed spectrum, starting a new data processing process includes:

selecting, by the processor 52, a licensed spectrum to start a new HARQ processing process, or after the base station re-acquires the unlicensed spectrum, starting a new HARQ processing process.

In some feasible implementation manners, the data processing process includes a discontinuous reception DRX process;

the pausing, by the processor 52, a data processing process attached to the unlicensed spectrum includes:

executing, by the processor 52, at least one of the following operations attached to the unlicensed spectrum: maintaining normal running of each DRX timer, pausing listening on a physical downlink control channel, pausing downlink receiving, or pausing uplink sending; and the resuming, by the processor 52, the data processing process after the base station re-acquires the unlicensed spectrum includes:

executing, by the processor 52, at least one of the following operations attached to the unlicensed spectrum: after the base station re-acquires the unlicensed spectrum, resuming listening on the physical downlink control channel, resuming downlink receiving, or resuming uplink sending.

In some feasible implementation manners, the data processing process includes a discontinuous reception DRX process;

the terminating, by the processor 52, the data processing process attached to the unlicensed spectrum includes:

executing, by the processor 52, at least one of the following operations attached to the unlicensed spectrum: executing an HARQ entity reset operation, executing a deactivation operation for a cell using the unlicensed spectrum, or stopping each DRX timer; and the selecting a licensed spectrum to start a new data processing process, or after the base station re-acquires the unlicensed spectrum, starting a new data processing process includes:

selecting, by the processor 52, a licensed spectrum to start a new DRX processing process, or maintaining a DRX processing process running in a licensed spectrum, or after the base station re-acquires the unlicensed spectrum, starting a new DRX processing process.

In some feasible implementation manners, when a cell in the unlicensed spectrum and a cell in the licensed spectrum use a same DRX parameter configuration and DRX operation, when terminating the data processing process attached to the unlicensed spectrum, the processor 52 does not stop each DRX timer; or when a cell in the unlicensed spectrum and a cell in the licensed spectrum execute different DRX parameter configurations, when terminating the data processing process attached to the unlicensed spectrum, the processor 52 stops each DRX timer.

In some feasible implementation manners, the data processing process includes an automatic repeat request ARQ process;

the pausing, by the processor 52, a data processing process attached to the unlicensed spectrum includes:

executing, by the processor 52, at least one of the following operations attached to the unlicensed spectrum: suspending a reordering timer of a radio link control layer RLC or suspending a poll retransmit timer; and the resuming, by the processor 52, the data processing process after the base station re-acquires the unlicensed spectrum includes:

after the base station re-acquires the unlicensed spectrum, executing, by the processor 52, at least one of the following operations attached to the unlicensed spectrum: resuming the reordering timer of the radio link control layer and triggering an RLC status report after the reordering timer times out; or resuming the poll retransmit timer, and after the poll retransmit timer times out, triggering retransmitting an RLC data unit provided with a poll bit or sending a new RLC data unit.

In some feasible implementation manners, the data processing process includes an automatic repeat request ARQ process;

the terminating, by the processor 52, the data processing process attached to the unlicensed spectrum includes:

executing, by the processor 52, at least one of the following operations attached to the unlicensed spectrum: stopping a reordering timer or stopping a poll retransmit timer; and the selecting a licensed spectrum to start a new data processing process, or after the base station re-acquires the unlicensed spectrum, starting a new data processing process includes:

selecting, by the processor 52, a licensed spectrum to start a new ARQ processing process, or after the base station re-acquires the unlicensed spectrum, starting a new ARQ processing process.

In some feasible implementation manners, the data processing process includes a random access procedure;

the pausing, by the processor 52, a data processing process attached to the unlicensed spectrum includes:

executing, by the processor 52, at least one of the following operations attached to the unlicensed spectrum:

suspending a random access response window or suspending a contention resolution timer; and the resuming, by the processor 52, the data processing process after the base station re-acquires the unlicensed spectrum includes:

after the base station re-acquires the unlicensed spectrum, executing, by the processor 52, at least one of the following operations attached to the unlicensed spectrum: resuming the random access response window or resuming running of the contention resolution timer.

In some feasible implementation manners, the data processing process includes a random access procedure;

the terminating, by the processor 52, the data processing process attached to the unlicensed spectrum includes:

executing, by the processor 52, at least one of the following operations attached to the unlicensed spectrum: stopping a random access response window and stopping waiting for a random access response message, or stopping a contention resolution timer and stopping waiting for a contention resolution message; and the selecting, by the processor 52, a licensed spectrum to start a new data processing process, or after the base station re-acquires the unlicensed spectrum, starting a new data processing process includes:

selecting, by the processor 52, a licensed spectrum to start a new random access procedure, or after the base station re-acquires the unlicensed spectrum, starting a new random access procedure.

In some feasible implementation manners, the data processing process includes a radio resource management RRM measurement process;

the pausing, by the processor 52, a data processing process attached to the unlicensed spectrum includes:

pausing, by the processor 52, the RRM measurement process; and the resuming, by the processor 52, the data processing process after the base station re-acquires the unlicensed spectrum includes:

resuming, by the processor 52, the RRM measurement process.

In some feasible implementation manners, the data processing process includes a radio resource management RRM measurement process;

the terminating, by the processor 52, the data processing process attached to the unlicensed spectrum includes:

releasing, by the processor 52, an RRM measurement parameter; and the selecting, by the processor 52, a licensed spectrum to start a new data processing process, or after the base station re-acquires the unlicensed spectrum, starting a new data processing process includes:

selecting, by the processor 52, a licensed spectrum to start a new RRM measurement process, or after the base station re-acquires the unlicensed spectrum, starting a new RRM process.

In some feasible implementation manners, the data processing process includes a channel state information CSI measurement process;

the pausing, by the processor 52, a data processing process attached to the unlicensed spectrum includes:

pausing, by the processor 52, the CSI measurement process; and the resuming, by the processor 52, the data processing process after the base station re-acquires the unlicensed spectrum includes:

resuming, by the processor 52, the CSI measurement process.

In some feasible implementation manners, the data processing process includes a channel state information CSI measurement process;

the terminating, by the processor 52, the data processing process attached to the unlicensed spectrum includes:

releasing, by the processor 52, a CSI measurement parameter; and the selecting, by the processor 52, a licensed spectrum to start a new data processing process, or after the base station re-acquires the unlicensed spectrum, starting a new data processing process includes:

selecting, by the processor 52, a licensed spectrum to start a new CSI measurement process, or after the base station re-acquires the unlicensed spectrum, starting a new CSI process.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A method for processing data after an unlicensed spectrum is released, the method comprising:
   when user equipment determines that a base station has released an unlicensed spectrum, monitoring, by the user equipment, a release time for which the unlicensed spectrum is released, wherein the release time indicates a time interval from when the base station releases the unlicensed spectrum to when the base station re-acquires the unlicensed spectrum;
   when the release time does not exceed a time threshold, pausing, by the user equipment, a data processing process attached to the unlicensed spectrum, and resuming the data processing process after the base station re-acquires the unlicensed spectrum; and
   when the release time exceeds the time threshold, terminating, by the user equipment, the data processing process attached to the unlicensed spectrum, and selecting a licensed spectrum to start a new data processing process, or after the base station re-acquires the unlicensed spectrum, starting a new data processing process.

2. The method for processing data after an unlicensed spectrum is released according to claim 1, wherein:
   the data processing process comprises a hybrid automatic repeat request (HARQ) process;
   pausing, by the user equipment, a data processing process attached to the unlicensed spectrum comprises:
      executing, by the user equipment, at least one of the following operations attached to the unlicensed spectrum: pausing listening on a physical downlink control channel, pausing downlink receiving, pausing uplink sending, reserving an HARQ buffer, pausing receiving downlink HARQ retransmission, pausing receiving downlink HARQ feedback information, pausing sending uplink HARQ retransmission, or pausing sending uplink HARQ feedback information; and resuming, by the user equipment, the data processing process after the base station re-acquires the unlicensed spectrum comprises:

after the base station re-acquires the unlicensed spectrum, executing, by the user equipment, at least one of the following operations attached to the unlicensed spectrum: resuming listening on the physical downlink control channel, resuming downlink receiving, resuming uplink sending, resuming receiving downlink HARQ retransmission, resuming receiving downlink HARQ feedback information, resuming sending uplink HARQ retransmission, or resuming sending uplink HARQ feedback information.

3. The method for processing data after an unlicensed spectrum is released according to claim 1, wherein:

the data processing process comprises a hybrid automatic repeat request (HARQ) process;

terminating, by the user equipment, the data processing process attached to the unlicensed spectrum comprises:

executing, by the user equipment, an HARQ entity reset operation, or executing a deactivation operation for a cell using the unlicensed spectrum; and selecting a licensed spectrum to start a new data processing process, or after the base station re-acquires the unlicensed spectrum, starting a new data processing process comprises:

selecting, by the user equipment, a licensed spectrum to start a new HARQ processing process, or after the base station re-acquires the unlicensed spectrum, starting a new HARQ processing process.

4. The method for processing data after an unlicensed spectrum is released according to claim 1, wherein:

the data processing process comprises a random access procedure;

pausing, by the user equipment, a data processing process attached to the unlicensed spectrum comprises:

executing, by the user equipment, at least one of the following operations attached to the unlicensed spectrum: suspending a random access response window or suspending a contention resolution timer; and resuming, by the user equipment, the data processing process after the base station re-acquires the unlicensed spectrum comprises:

after the base station re-acquires the unlicensed spectrum, executing, by the user equipment, at least one of the following operations attached to the unlicensed spectrum: resuming the random access response window or resuming running of the contention resolution timer.

5. The method for processing data after an unlicensed spectrum is released according to claim 1, wherein:

the data processing process comprises a random access procedure;

terminating, by the user equipment, the data processing process attached to the unlicensed spectrum comprises:

executing, by the user equipment, at least one of the following operations attached to the unlicensed spectrum: stopping a random access response window and stopping waiting for a random access response message, or stopping a contention resolution timer and stopping waiting for a contention resolution message; and selecting, by the user equipment, a licensed spectrum to start a new data processing process, or after the base station re-acquires the unlicensed spectrum, starting a new data processing process comprises:

selecting, by the user equipment, a licensed spectrum to start a new random access procedure, or after the base station re-acquires the unlicensed spectrum, starting a new random access procedure.

6. User equipment, comprising:

a memory and a processor, wherein a program stored in the memory which, when executed by the processor, causes the processor to:

when determining that a base station has released an unlicensed spectrum, monitor release time for which the unlicensed spectrum is released, wherein the release time indicates a time interval from when the base station releases the unlicensed spectrum to when the base station re-acquires the unlicensed spectrum;

when the release time does not exceed a time threshold, pause a data processing process attached to the unlicensed spectrum, and resume the data processing process after the base station re-acquires the unlicensed spectrum; and when the release time exceeds the time threshold, terminate the data processing process attached to the unlicensed spectrum, and select a licensed spectrum to start a new data processing process, or after the base station re-acquires the unlicensed spectrum, start a new data processing process.

7. The user equipment according to claim 6, wherein:

the data processing process comprises a hybrid automatic repeat request (HARQ) process; and the program stored in the memory which, when executed by the processor, further causes the processor to:

execute, by the processor, at least one of the following operations attached to the unlicensed spectrum: pausing listening on a physical downlink control channel, pausing downlink receiving, pausing uplink sending, reserving an HARQ buffer, pausing receiving downlink HARQ retransmission, pausing receiving downlink HARQ feedback information, pausing sending uplink HARQ retransmission, or pausing sending uplink HARQ feedback information, and after the base station re-acquires the unlicensed spectrum, execute, by the processor, at least one of the following operations attached to the unlicensed spectrum: resuming listening on the physical downlink control channel, resuming downlink receiving, resuming uplink sending, resuming receiving downlink HARQ retransmission, resuming receiving downlink HARQ feedback information, resuming sending uplink HARQ retransmission, or resuming sending uplink HARQ feedback information.

8. The user equipment according to claim 6, wherein:

the data processing process comprises a hybrid automatic repeat request (HARQ) process;

the program stored in the memory which, when executed by the processor, further causes the processor to:

execute, by the processor, an HARQ entity reset operation, or execute a deactivation operation for a cell using the unlicensed spectrum, and select, by the processor, a licensed spectrum to start a new HARQ processing process, or after the base station re-acquires the unlicensed spectrum, start a new HARQ processing process.

9. The user equipment according to claim 6, wherein:
the data processing process comprises a random access procedure;
the program stored in the memory which, when executed by the processor, further causes the processor to:
    execute, by the processor, at least one of the following operations attached to the unlicensed spectrum: suspending a random access response window or suspending a contention resolution timer, and
    after the base station re-acquires the unlicensed spectrum, execute, by the processor, at least one of the following operations attached to the unlicensed spectrum: resuming the random access response window or resuming running of the contention resolution timer.

10. The user equipment according to claim 6, wherein:
the data processing process comprises a random access procedure;
the program stored in the memory which, when executed by the processor, further causes the processor to:
    execute, by the processor, at least one of the following operations attached to the unlicensed spectrum: stopping a random access response window and stopping waiting for a random access response message, or stopping a contention resolution timer and stopping waiting for a contention resolution message, and
    select, by the processor, a licensed spectrum to start a new random access procedure, or after the base station re-acquires the unlicensed spectrum, start a new random access procedure.

* * * * *